(12) United States Patent
Pyo et al.

(10) Patent No.: US 11,616,934 B2
(45) Date of Patent: Mar. 28, 2023

(54) IMAGE SENSOR

(71) Applicant: SAMSUNG ELECTRONICS CO., LTD., Suwon-si (KR)

(72) Inventors: Junghyung Pyo, Seoul (KR); Kyungho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/509,696

(22) Filed: Oct. 25, 2021

(65) Prior Publication Data

US 2022/0303509 A1 Sep. 22, 2022

(30) Foreign Application Priority Data

Mar. 22, 2021 (KR) ................. 10-2021-0036431

(51) Int. Cl.
*H04N 5/374* (2011.01)
*H04N 5/351* (2011.01)
*H04N 9/04* (2006.01)
*H04N 5/369* (2011.01)
*G06T 3/40* (2006.01)
*H04N 5/3745* (2011.01)

(52) U.S. Cl.
CPC ......... *H04N 9/04551* (2018.08); *H04N 5/351* (2013.01); *H04N 5/3745* (2013.01)

(58) Field of Classification Search
CPC .. H04N 5/3745; H04N 5/351; H04N 5/37457; H04N 5/359; H04N 5/369; H04N 5/378; H04N 9/0455; G06T 3/4015; G06T 3/4038; G06T 2200/36
See application file for complete search history.

(56) References Cited

U.S. PATENT DOCUMENTS

| 8,866,944 B2 | 10/2014 | Tu et al. |
| 9,219,893 B2 * | 12/2015 | Tu ........................ H04N 9/07 |
| 2010/0231770 A1 * | 9/2010 | Honda ............... H04N 9/04559 |
| | | 348/308 |
| 2011/0102638 A1 | 5/2011 | Susanu et al. |
| 2013/0050282 A1 | 2/2013 | Kim et al. |
| 2014/0184863 A1 | 7/2014 | Tu et al. |
| 2019/0281226 A1 | 9/2019 | Wang et al. |

(Continued)

FOREIGN PATENT DOCUMENTS

KR 1020190106599 A 9/2019

*Primary Examiner* — Marly S Camargo
(74) *Attorney, Agent, or Firm* — Volentine, Whitt & Francos, PLLC

(57) ABSTRACT

An image sensor includes a pixel array with pixels arranged in a first direction and a second direction, intersecting the first direction. Each of the pixels includes a photodiode, a pixel circuit below the photodiode, and a color filter on or above the photodiode. A logic circuit acquires a pixel signal from the pixels through a plurality of column lines extending in the second direction. The pixels include color pixels and white pixels, the number of white pixels being greater than the number of color pixels. The pixel circuit includes a floating diffusion in which charges of the photodiode are accumulated and transistors outputting a voltage corresponding to amounts of charges in the floating diffusion. Each of the color pixels shares the floating diffusion with at least one neighboring white pixel, adjacent thereto in the second direction, among the white pixels.

20 Claims, 27 Drawing Sheets

(56) References Cited

U.S. PATENT DOCUMENTS

| | | |
|---|---|---|
| 2020/0074591 A1 | 3/2020 | Oleszkiewicz et al. |
| 2020/0099873 A1 | 3/2020 | Hwang et al. |
| 2020/0120298 A1* | 4/2020 | Takashi .................. H04N 5/347 |
| 2021/0175269 A1* | 6/2021 | Fujita ................ H01L 27/14612 |
| 2021/0250529 A1* | 8/2021 | Baek .................. H04N 5/35554 |
| 2022/0286635 A1* | 9/2022 | Jung ...................... H04N 5/347 |

* cited by examiner

IMAGE SENSOR

CROSS-REFERENCE TO RELATED APPLICATION(S)

This application claims benefit of priority to Korean Patent Application No. 10-2021-0036431 filed on Mar. 22, 2021, in the Korean Intellectual Property Office, the disclosure of which is incorporated herein by reference in its entirety.

BACKGROUND

The present disclosure relates to an image sensor.

An image sensor is a semiconductor-based sensor receiving light and generating an electrical signal and may include a pixel array having a plurality of pixels, a logic circuit driving the pixel array and generating an image, and the like. The logic circuit may acquire a pixel signal from the pixels to generate image data. Recently, various methods for improving image quality by increasing sensitivity of an image sensor have been proposed.

SUMMARY

An aspect of the present disclosure is to provide an image sensor having excellent sensitivity and resolution.

According to an aspect of the present disclosure, an image sensor includes a pixel array including a plurality of pixels arranged in a first direction and a second direction, intersecting with the first direction. Each of the plurality of pixels includes at least one photodiode, a pixel circuit below the photodiode, and a color filter above the photodiode. A logic circuit is configured to acquire a pixel signal from the plurality of pixels through a plurality of column lines extending in the second direction. The plurality of pixels includes color pixels and white pixels, the number of the white pixels being greater than the number of the color pixels. The pixel circuit includes a floating diffusion in which charges of the photodiode are accumulated and transistors outputting a voltage corresponding to amounts of charges in the floating diffusion. Each of the color pixels shares the floating diffusion with at least one neighboring white pixel, among the white pixels, and each of the color pixels is adjacent to the at least one neighboring white pixel, in the second direction.

According to an aspect of the present disclosure, an image sensor includes a pixel array including a plurality of pixels connected to a plurality of row lines extending in a first direction and a plurality of column lines extending in a second direction, intersecting with the first direction. Each of the plurality of pixels includes at least one photodiode and a pixel circuit below the at least one photodiode. A logic circuit is configured to acquire a pixel signal from the plurality of pixels. The plurality of pixels includes color pixels and white pixels, the number of the white pixels being greater than the number of the color pixels. The logic circuit is configured to acquire the pixel signal only from the color pixels when external illuminance is equal to or higher than a threshold value and acquire the pixel signal from the plurality of pixels when external illuminance is lower than the threshold value.

According to an aspect of the present disclosure, an image sensor includes a pixel array including a plurality of pixels connected to a plurality of row lines extending in a first direction and a plurality of column lines extending in a second direction, intersecting with the first direction. The plurality of pixels provides a plurality of pixel groups. A logic circuit is configured to acquire a pixel signal from the plurality of pixels. The plurality of pixels includes color pixels and white pixels, the number of the white pixels being greater than the number of the color pixels. Each of the plurality of pixel groups includes at least one color pixel among the color pixels and peripheral white pixels disposed around the at least one color pixel among the white pixels. A boundary between a pair of adjacent pixel groups among the plurality of pixel groups is a boundary between the peripheral white pixels.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred embodiments of the present disclosure will be described with reference to the accompanying drawings.

Figure 1:
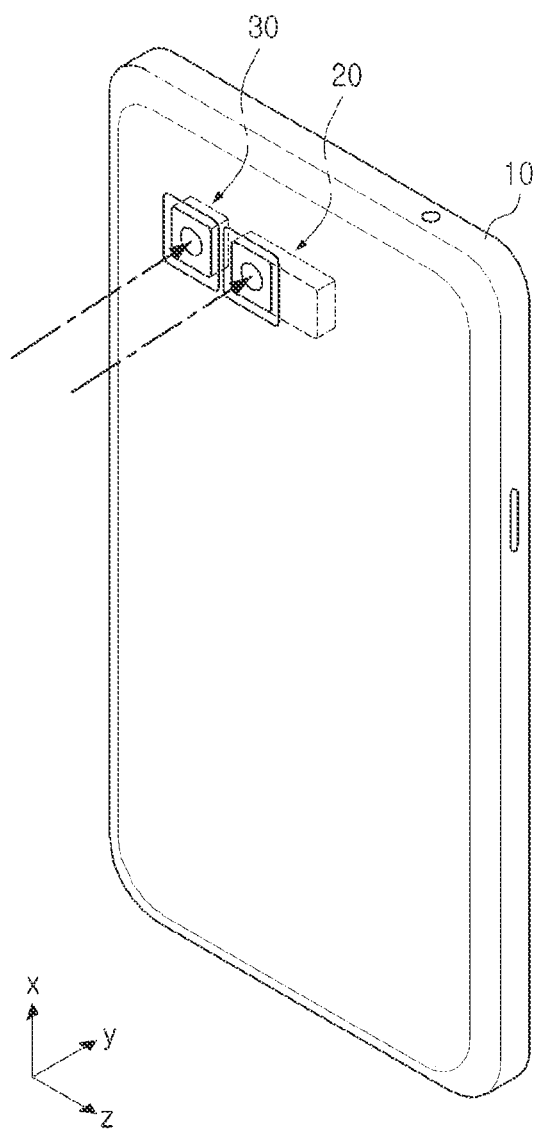
FIG. 1 is a view schematically illustrating an electronic device including an image sensor according to an embodiment of the present disclosure.

FIG. 1 is a view schematically illustrating an electronic device including an image sensor according to an embodiment of the present disclosure.

Referring to FIG. 1, an electronic device 10 according to an embodiment of the present disclosure may be a mobile device such as a smartphone or the like, and may include camera devices 20 and 30. However, it should be understood that the electronic device 10 according to an embodiment of the present disclosure is not limited to a mobile device and may include all devices including the camera devices 20 and 30. Also, the number of camera devices 20 and 30 included in the electronic device 10 may be variously modified.

In an embodiment illustrated in FIG. 1, the electronic device 10 may include a first camera device 20 and a second camera device 30 and the first camera device 20 and the second camera device 30 may include an image sensor and an optical module for guiding incident light to the image sensor, respectively. The first camera device 20 and the second camera device 30 may have different structures. For example, an image sensor included in the first camera device 20 may have an upper surface of a pixel array, parallel to an X-Y plane, and an image sensor included in the second camera device 30 may have an upper surface of a pixel array, parallel to the X-Y plane. An optical module of the first camera device 20 may include a refractive member refracting incident light and transmitting the same to the pixel array of the image sensor. For example, the refractive member may be implemented as a prism or the like.

Figure 2:
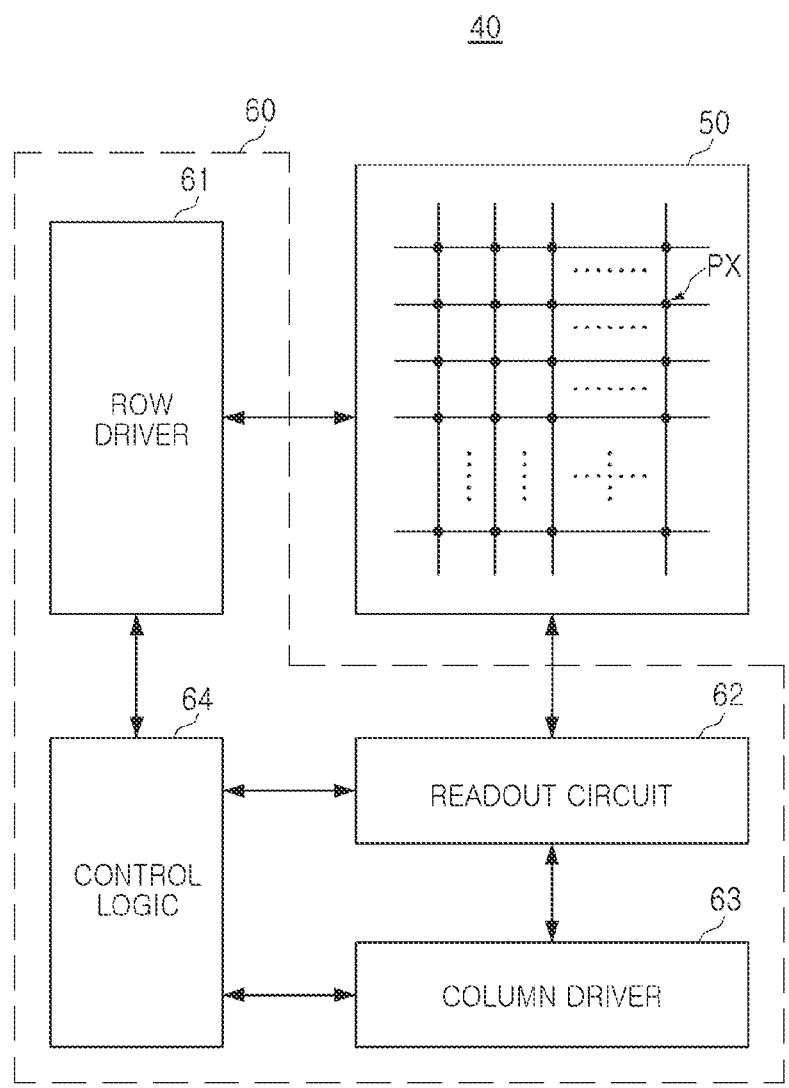
FIG. 2 is a block diagram schematically illustrating an image sensor according to an embodiment of the present disclosure.

FIG. 2 is a block diagram schematically illustrating an image sensor according to an embodiment of the present disclosure.

Referring to FIG. 2, an image sensor 40 may include a pixel array 50, a logic circuit 60, and the like.

The pixel array 50 may include a plurality of pixels PX arranged in an array form in a plurality of rows and a plurality of columns. Each of the plurality of pixels PX may include at least one photoelectric conversion element that generates charge in response to light, a pixel circuit that generates a pixel signal corresponding to the charge generated by the photoelectric conversion element, and the like. The photoelectric conversion element may include a photodiode formed of a semiconductor material, an organic photodiode formed of an organic material, and/or the like.

For example, the pixel circuit may include a floating diffusion, a transfer transistor, a reset transistor, a drive transistor, a select transistor, or the like. A configuration of the pixels PX may vary according to embodiments. For example, each of the pixels PX may include an organic photodiode including an organic material or may be implemented as a digital pixel. When the pixels PX are implemented as digital pixels, each of the pixels PX may include an analog-to-digital converter for outputting a digital pixel signal.

The logic circuit 60 may include circuits for controlling the pixel array 50. For example, the logic circuit 60 may include a row driver 61, a readout circuit 62, a column driver 63, a control logic 64, and the like. The row driver 61 may drive the pixel array 50 in units of row lines. For example, the row driver 61 may generate a transmission control signal for controlling the transfer transistor of the pixel circuit, a reset control signal for controlling the reset transistor, a select control signal for controlling the select transistor or the like, to input them into the pixel array 50 in units of row lines.

The readout circuit 62 may include a correlated double sampler (CDS), an analog-to-digital converter (ADC), or the like. The correlated double samplers may be connected to the pixels PX through column lines. The correlated double samplers may read a pixel signal through column lines, from the pixels PX connected to a row line selected by a row line select signal of the row driver 61. The analog-to-digital converter may convert the pixel signal detected by the correlated double sampler into a digital pixel signal and may transmit the digital pixel signal to the column driver 63.

The column driver 63 may include a latch circuit or a buffer circuit for temporarily storing the digital pixel signal, an amplifying circuit, and the like and may process the digital pixel signal received from the readout circuit 62. The row driver 61, the readout circuit 62, and the column driver 63 may be controlled by the control logic 64. The control logic 64 may include a timing controller for controlling operation timing of the row driver 61, the readout circuit 62, and the column driver 63 and the like.

Among the pixels PX, pixels PX disposed at the same position in a first direction (a horizontal direction) may share the same column line. For example, pixels PX disposed at the same position in a second direction (a vertical direction) may be simultaneously selected by the row driver 61 and may output pixel signals through column lines. In an embodiment, the readout circuit 62 may simultaneously acquire the pixel signals through column lines, from the pixels PX selected by the row driver 61. The pixel signal may include a reset voltage and a pixel voltage. The pixel voltage may be a voltage in which charges generated in response to light in each of the pixels PX are reflected in the reset voltage.

In an embodiment, at least a portion of the pixels PX included in the pixel array 50 may provide one pixel group. Therefore, a plurality of pixel groups may be disposed in the pixel array 50. At least a portion of the photodiodes included in one pixel group may share elements such as a floating diffusion, a reset transistor, a drive transistor, a select transistor, or the like.

In order to increase sensitivity of the image sensor 40, an area of each of the pixels PX included in the pixel array 50 may be increased. When an area of each of the pixels PX increases, a total area of the image sensor 40 may inevitably increase in order to generate a high-resolution image. In this case, a volume of an electronic device on which the image sensor 40 is mounted may increase together therewith.

The present disclosure proposes an image sensor 40 capable of simultaneously providing high sensitivity and resolution while implementing each of the pixels PX in a small area. For example, some of the pixels PX may be implemented as color pixels, and others of the pixels PX may be implemented as white pixels. In an embodiment, the number and arrangement of white pixels and color pixels may be determined in consideration of a ratio of rod cells sensing brightness of light and cone cells sensing a color of the light, among cells present in a human eye. Therefore, the image sensor 40 having high sensitivity, while minimizing an increase in area of each of the pixels PX, may be implemented.

Figure 3:
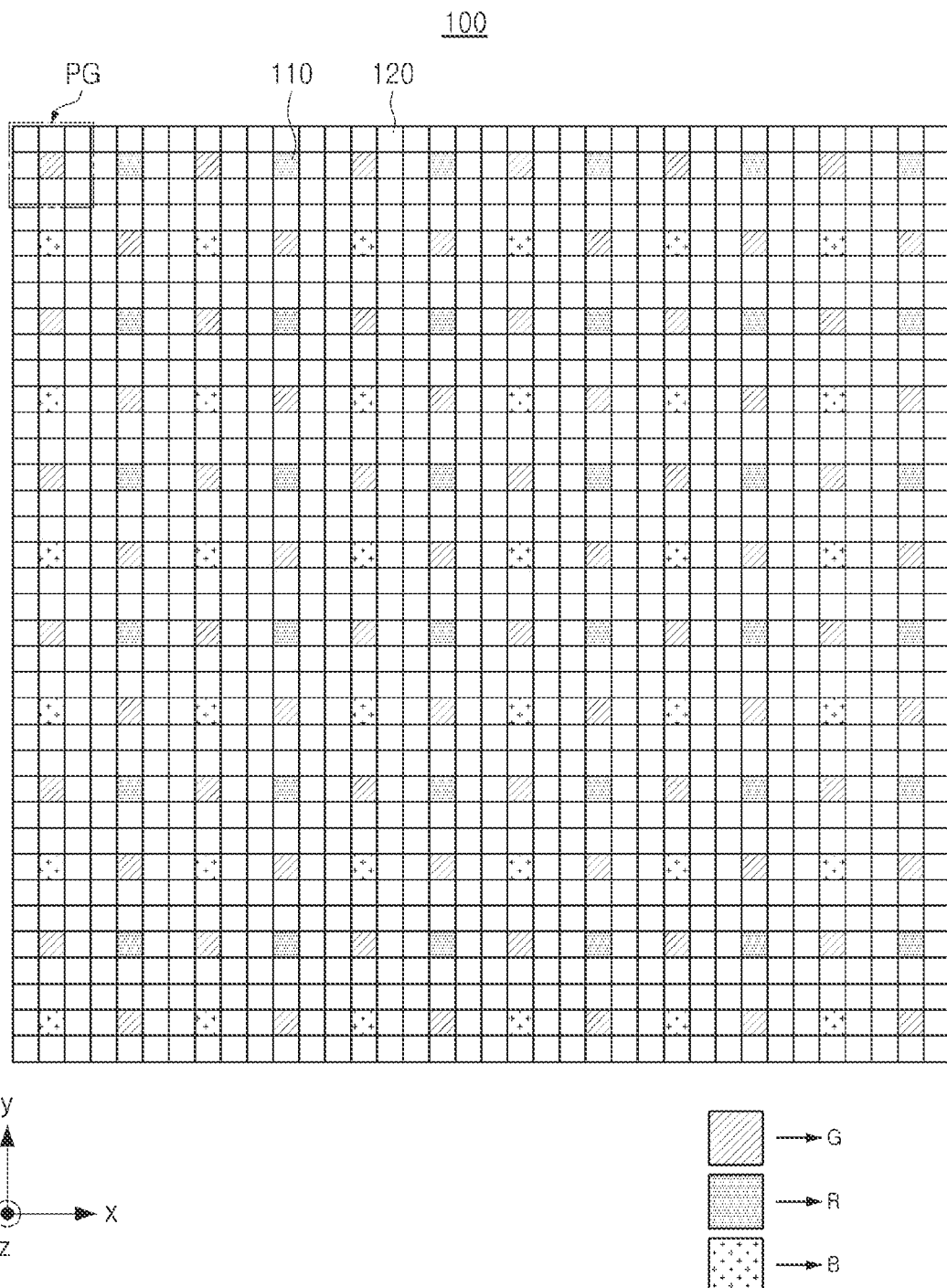
FIG. 3 is a view schematically illustrating a pixel array of an image sensor according to an embodiment of the present disclosure.

FIG. 3 is a view schematically illustrating a pixel array of an image sensor according to an embodiment of the present disclosure.

Referring to FIG. 3, a pixel array 100 of an image sensor according to an embodiment of the present disclosure may include a plurality of pixels 110 and 120 arranged in the first direction (the X-axis direction) and the second direction (the Y-axis direction). For example, the pixel array 100 may include a color pixel 110 and a white pixel 120. The color pixel 110 and the white pixel 120 may be provided as a plurality of color pixels 110 and a plurality of white pixels 120, respectively, and the number thereof may be variously changed. For example, the number of white pixels 120 may be greater than the number of color pixels 110.

For example, the number of color pixels 110 and the number of white pixels 120 may be determined in consideration of the number of cone cells and rod cells present in a human eye. Millions of cone cells and tens of millions of rod cells may exist in the human eye, and a ratio of the number of color pixels 110 to the number of white pixels 120 may be determined in consideration thereof. In an embodiment illustrated in FIG. 3, the number of white pixels 120 may be eight times the number of color pixels 110. The number of color pixels 110 and the number of white pixels 120 may be variously changed according to embodiments.

The color pixel 110 may provide a pixel group PG, together with peripheral white pixels disposed around the color pixel 110 among the white pixels 120. Referring to FIG. 3, one color pixel 110 may provide one pixel group PG, together with eight peripheral white pixels.

In each of the pixel groups PG, the color pixels 110 may be disposed at the same position. Referring to FIG. 3, in each of the pixel groups PG, the color pixel 110 may be disposed in a central portion. Therefore, a boundary between a pair of pixel groups PG continuously arranged in the first direction or the second direction may be defined as a boundary between peripheral white pixels. For example, the boundary between the pair of pixel groups PG may be adjacent to only the white pixel 120 and may not be adjacent to the color pixel 110.

The color pixel 110 may include a color filter selectively passing light of a specific wavelength. For example, the color filter may pass one of red, green, and blue light. Referring to FIG. 3, a color pixel 110 included in one pixel group PG may include a color filter having a color different from that of a color pixel 110 included in another pixel group PG, adjacent in the first direction or the second direction. Color pixels 110 included in the four pixel groups PG disposed adjacent to each other in a 2×2 form in the first direction and the second direction may include two green color pixels, one red color pixel, and one blue color pixel.

Figure 4:
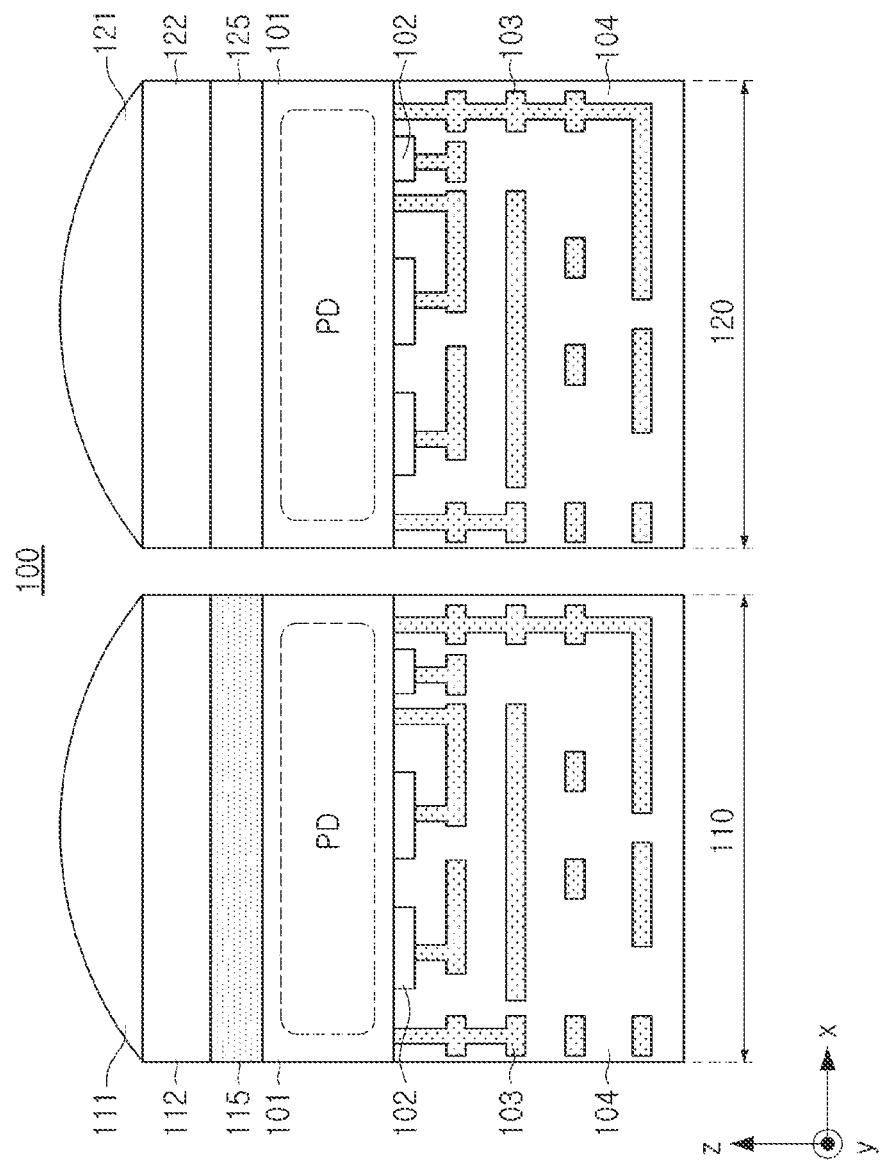
FIG. 4 is a view schematically illustrating pixels included in an image sensor according to an embodiment of the present disclosure.

FIG. 4 is a view schematically illustrating pixels included in an image sensor according to an embodiment of the present disclosure.

For example, FIG. 4 may be cross-sectional views of the color pixel 110 and the white pixel 120 in the pixel array 100 according to the embodiment illustrated in FIG. 3. Each of the color pixel 110 and the white pixel 120 may include a photodiode PD formed in a semiconductor substrate 101. In each of the color pixel 110 and the white pixel 120, the photodiode PD may be connected to elements 102 and the elements 102 may provide a pixel circuit, together with wiring patterns 103. The elements 102 and the wiring patterns 103 may be covered with an insulating layer 104.

Referring to FIG. 4, the color pixel 110 may include a first microlens 111, a first light transmitting layer 112, and a first color filter 115 arranged in an incident path of light. In addition, the white pixel 120 may include a second microlens 121, a second light transmitting layer 122, and a second color filter 125 arranged in an incident path of light. According to an embodiment, the first color filter 115 may pass light of a specific wavelength band. For example, the first color filter 115 may pass light of a wavelength band corresponding to one of red, green, and blue colors. The second color filter 125 may pass light of most wavelength bands, not a specific wavelength band. In an embodiment, the second color filter 125 may be formed of the same material as the light transmitting layer 122.

Therefore, the photodiode PD of the color pixel 110 may generate charges in response to light of a specific wavelength band passing through the first color filter 115, while the photodiode PD of the white pixel 120 may generate charges in response to light passing through the second color filter 125. Therefore, in response to light of the same intensity, the photodiode PD of the white pixel 120 may generate more charges than the photodiode PD of the color pixel 110, and the white pixel 120 may have higher sensitivity than the color pixel 110.

In an embodiment of the present disclosure, the pixel array 100 may include a larger number of white pixels 120 than the color pixels 110. By disposing more white pixels 120 in the pixel array 100 compared to the color pixels 110, sensitivity of the image sensor may be improved, and high-quality images may be acquired even in a low illuminance environment. For example, as illustrated in FIG. 3, a ratio of the number of color pixels 110 to the number of white pixels 120 may be configured to be 1:8, to improve sensitivity of the image sensor three times or more, as compared to a case in which a pixel array 100 is configured to have only color pixels 110. In an embodiment, the image sensor may generate an image by binning pixel signals of color pixels 110 and white pixels 120 included in one pixel group PG in a low illuminance environment.

There may be a problem in that, since sensitivity of the white pixel 120 is higher than sensitivity of the color pixel 110, when the image sensor operates in the same manner as in a low illuminance environment even in a high illuminance environment, the photodiode PD of the white pixel 120 is saturated to deteriorate image quality. According to an embodiment of the present disclosure, the above problem may be solved by generating an image using only a pixel signal generated by the color pixel 110 in a high illuminance environment. For example, in a high illuminance environment, the image sensor may use a remosaic method to generate an image using only a pixel signal generated by the color pixel 110.

Figure 5:
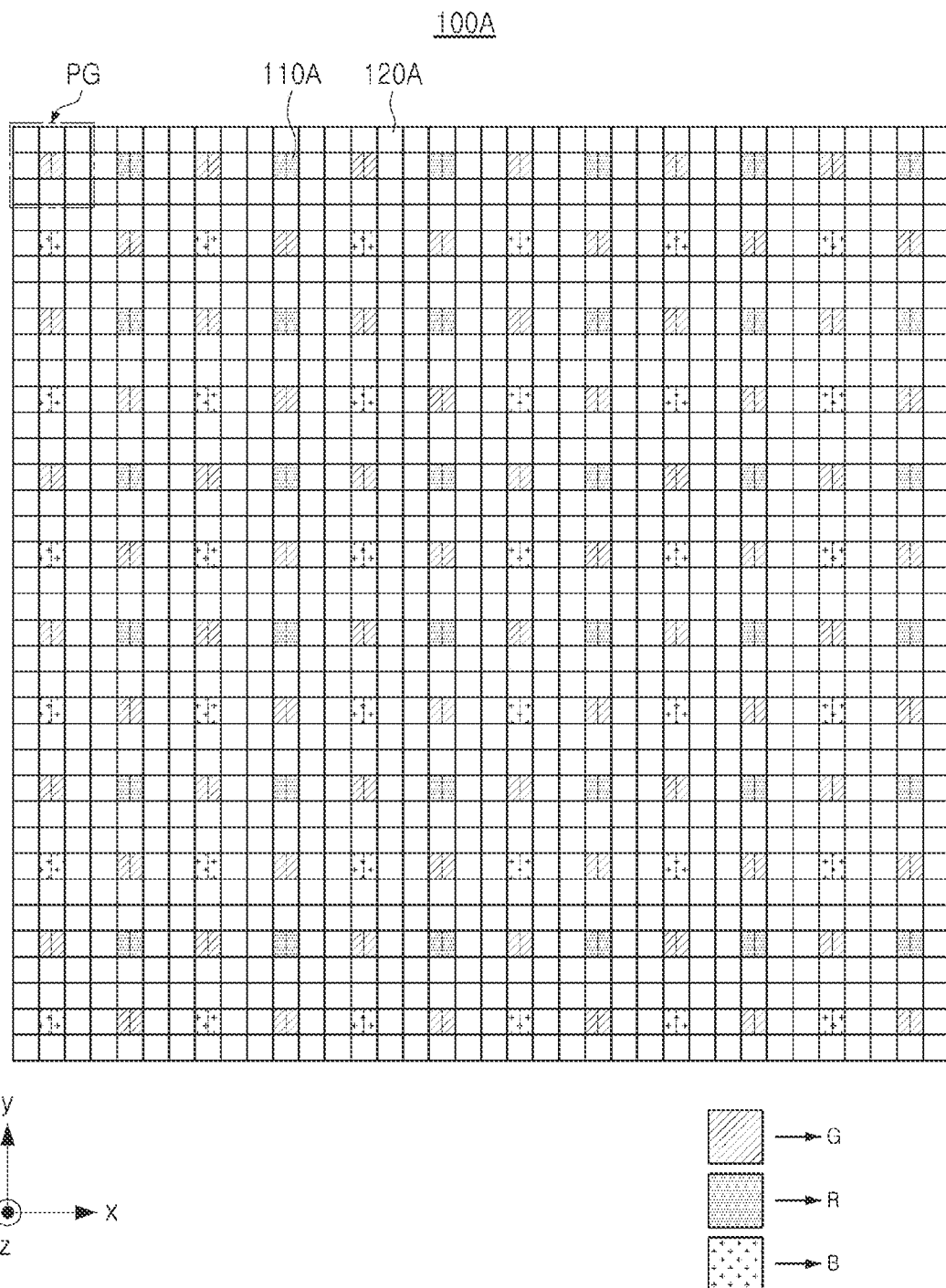
FIG. 5 is a view schematically illustrating a pixel array of an image sensor according to an embodiment of the present disclosure.

FIG. 5 is a view schematically illustrating a pixel array of an image sensor according to an embodiment of the present disclosure.

Referring to FIG. 5, a pixel array 100A of an image sensor according to an embodiment of the present disclosure may include a plurality of pixels 110A and 120A arranged in the first direction (the X-axis direction) and the second direction (the Y-axis direction). Arrangement of the color pixel 110A and the white pixel 120A in the pixel array 100A may be similar to that described above with reference to FIG. 3. For example, the pixel array 100A may provide one pixel group PG and the pixel group PG may include a color pixel 110A and peripheral white pixels, which are each a white pixel 120A disposed around the color pixel 110A.

Referring to FIG. 5, the color pixel 110A may include two or more photodiodes to provide an autofocusing function. For example, the color pixel 110A may include two or more photodiodes arranged in at least one of the first direction (the X-axis direction) or the second direction (the Y-axis direction), and an autofocusing function may be implemented using a phase difference between pixel signals acquired from the photodiodes included in the color pixel 110A.

Figure 6:
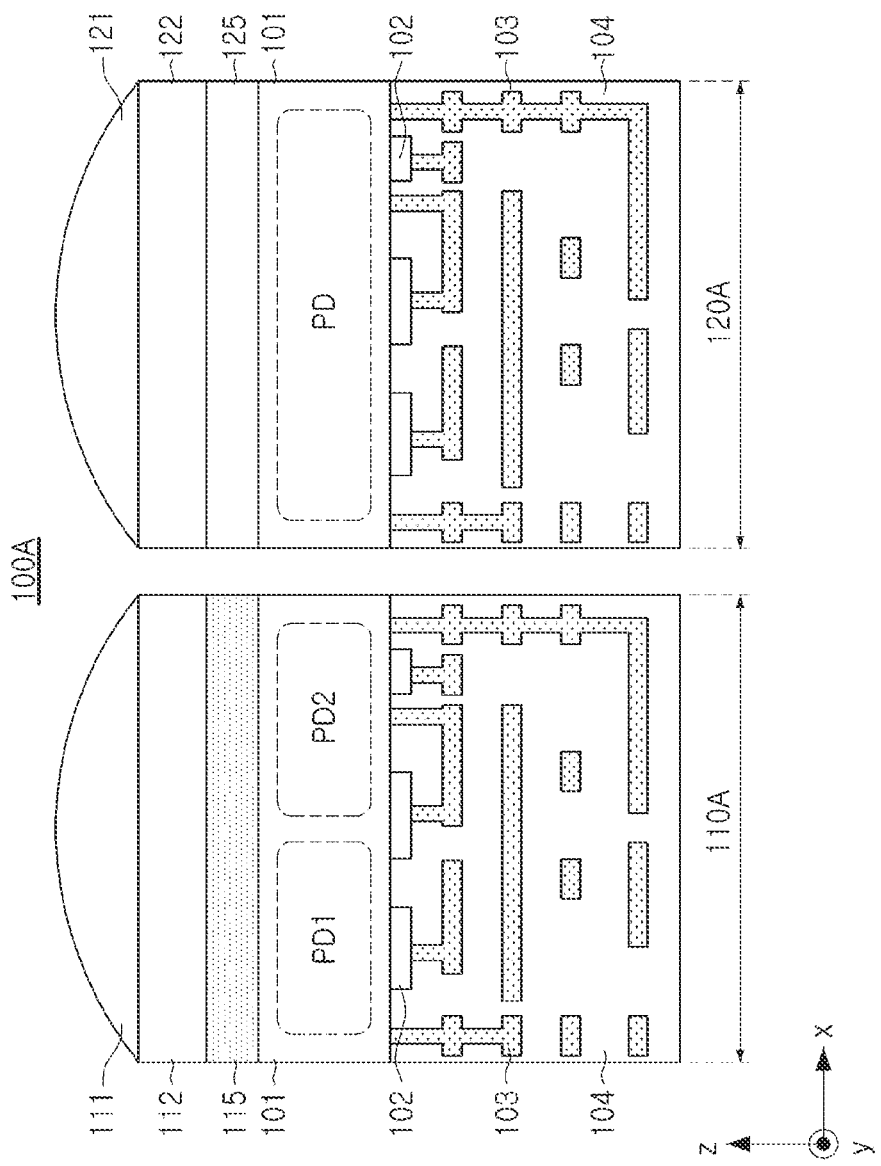
FIG. 6 is a view schematically illustrating pixels included in an image sensor according to an embodiment of the present disclosure.

FIG. 6 is a view schematically illustrating pixels included in an image sensor according to an embodiment of the present disclosure.

For example, FIG. 6 may be cross-sectional views of the color pixel 110A and the white pixel 120A in the pixel array 100A according to the embodiment illustrated in FIG. 5. Similarly to that described above with reference to FIG. 4, each of the color pixel 110A and the white pixel 120A may include a photodiode PD formed in a semiconductor substrate 101. In each of the color pixel 110A and the white pixel 120A, elements 102 formed on one surface of the semiconductor substrate 101 may provide a pixel circuit together with wiring patterns 103. The elements 102 and the wiring patterns 103 may be covered with an insulating layer 104.

Microlenses 111 and 121, light transmitting layers 112 and 122, and color filters 115 and 125 may be formed on the other surface of the semiconductor substrate 101. Configurations of the microlenses 111 and 121, the light transmitting layers 112 and 122, and the color filters 115 and 125 may be similar to those described above with reference to FIG. 4.

Referring to FIG. 6, unlike the white pixel 120A including one photodiode PD, the color pixel 110A may include a first photodiode PD1 and a second photodiode PD2 arranged in the first direction. A light receiving area of the first photodiode PD1 may be substantially equal to a light receiving area of the second photodiode PD2.

The color pixel 110A may be implemented to include the first photodiode PD1 and the second photodiode PD2 to provide an autofocusing function for the image sensor. For example, according to a wavelength band of light transmitted by the light transmitting layer 115, the color pixel 110A may calculate a distance to a specific region of a subject. When the light transmitting layer 115 transmits light in a wavelength band corresponding to a red color, the image sensor may calculate a distance to a red region of the subject using a phase difference between pixel signals acquired from the color pixel 110A. Similarly, when the light transmitting layer 115 transmits light of a wavelength band corresponding to a green color or a blue color, the image sensor may calculate a distance to a green region or a blue region of the subject using a phase difference between pixel signals acquired from the color pixel 110A.

Figure 7:
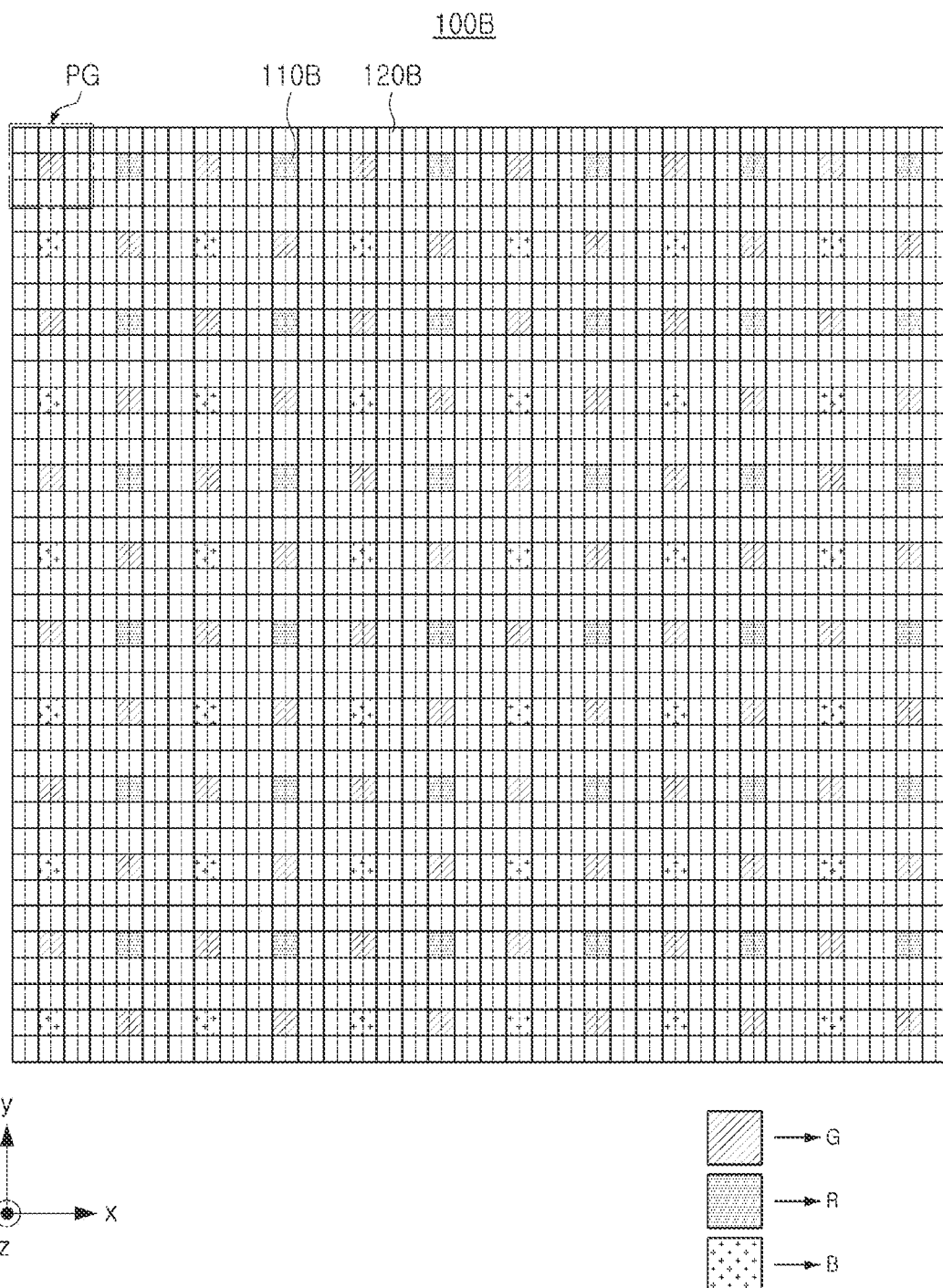
FIG. 7 is a view schematically illustrating a pixel array of an image sensor according to an embodiment of the present disclosure.

FIG. 7 is a view schematically illustrating a pixel array of an image sensor according to an embodiment of the present disclosure.

Referring to FIG. 7, a pixel array 100B of an image sensor according to an embodiment of the present disclosure may include a plurality of pixels 110B and 120B arranged in the first direction (the X-axis direction) and the second direction (the Y-axis direction). Arrangement of the color pixel 110B and the white pixel 120B in the pixel array 100B may be similar to that described above with reference to FIGS. 3 and 5. For example, the pixel array 100B may provide one pixel group PG, and the pixel group PG may include a color pixel 110B and peripheral white pixels, which are each a white pixel 120B disposed around the color pixel 110B.

In the embodiment illustrated in FIG. 7, the color pixel 110B and the white pixel 120B may include two or more photodiodes, respectively, to provide an autofocusing function. For example, the color pixel 110B as well as the white pixel 120B may include two or more photodiodes arranged in at least one of the first direction (the X-axis direction) or the second direction (the Y-axis direction). The image sensor may implement an autofocusing function by using a phase difference between pixel signals acquired from the photodiodes included in the color pixel 110B and the white pixel 120B. Referring to FIG. 7, photodiodes are illustrated as being arranged in the first direction in all of the pixels 110B and 120B included in the pixel array 100B. According to embodiments, in at least one of the pixels 110B or 120B, photodiodes may be arranged in the second direction.

Figure 8:
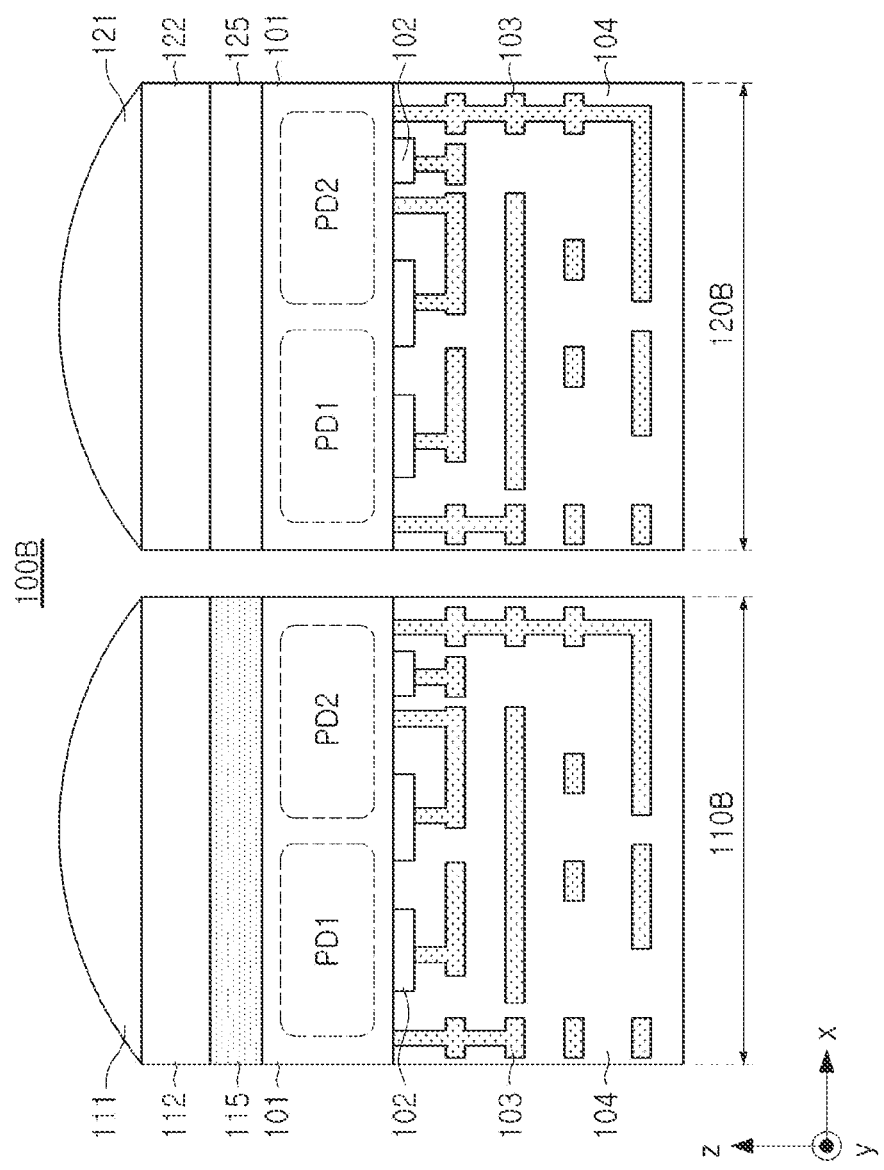
FIG. 8 is a view schematically illustrating pixels included in an image sensor according to an embodiment of the present disclosure.

FIG. 8 is a view schematically illustrating pixels included in an image sensor according to an embodiment of the present disclosure.

Referring to FIG. 8, the color pixel 110B and the white pixel 120B may include a first photodiode PD1 and a second photodiode PD2 arranged in the first direction, respectively. In each of the color pixel 110B and the white pixel 120B, a light receiving area of the first photodiode PD1 may be substantially equal to a light receiving area of the second photodiode PD2. Elements 102 and wiring patterns 103, providing a pixel circuit, and an insulating layer 104 covering the elements 102 and the wiring patterns 103 may be disposed on one surface of a semiconductor substrate 101. Microlenses 111 and 121, light transmitting layers 112 and 122, and color filters 115 and 125 may be disposed on the other surface of the semiconductor substrate 101.

In the embodiment illustrated in FIG. 8, since all of the pixels 110B and 120B include the first photodiode PD1 and the second photodiode PD2, a relatively better autofocusing function may be provided. Also, in some embodiments, the first photodiode PD1 and the second photodiode PD2 may be formed to be arranged in the second direction in some of the pixels 110B and 120B, to implement an autofocusing function in all of the first direction and the second direction.

Figure 9:
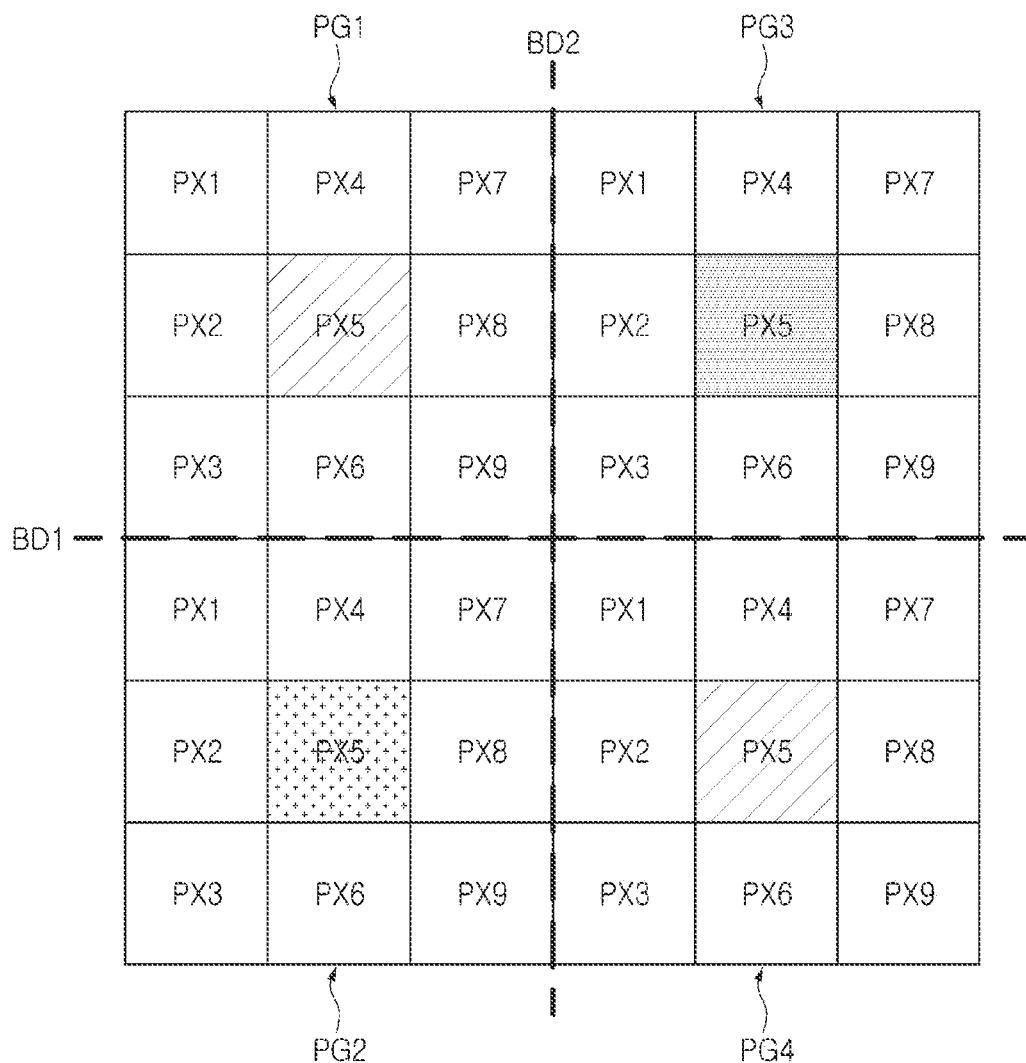
FIG. 9 is a view schematically illustrating a pixel group included in a pixel array of an image sensor according to an embodiment of the present disclosure.
Figure 10A:
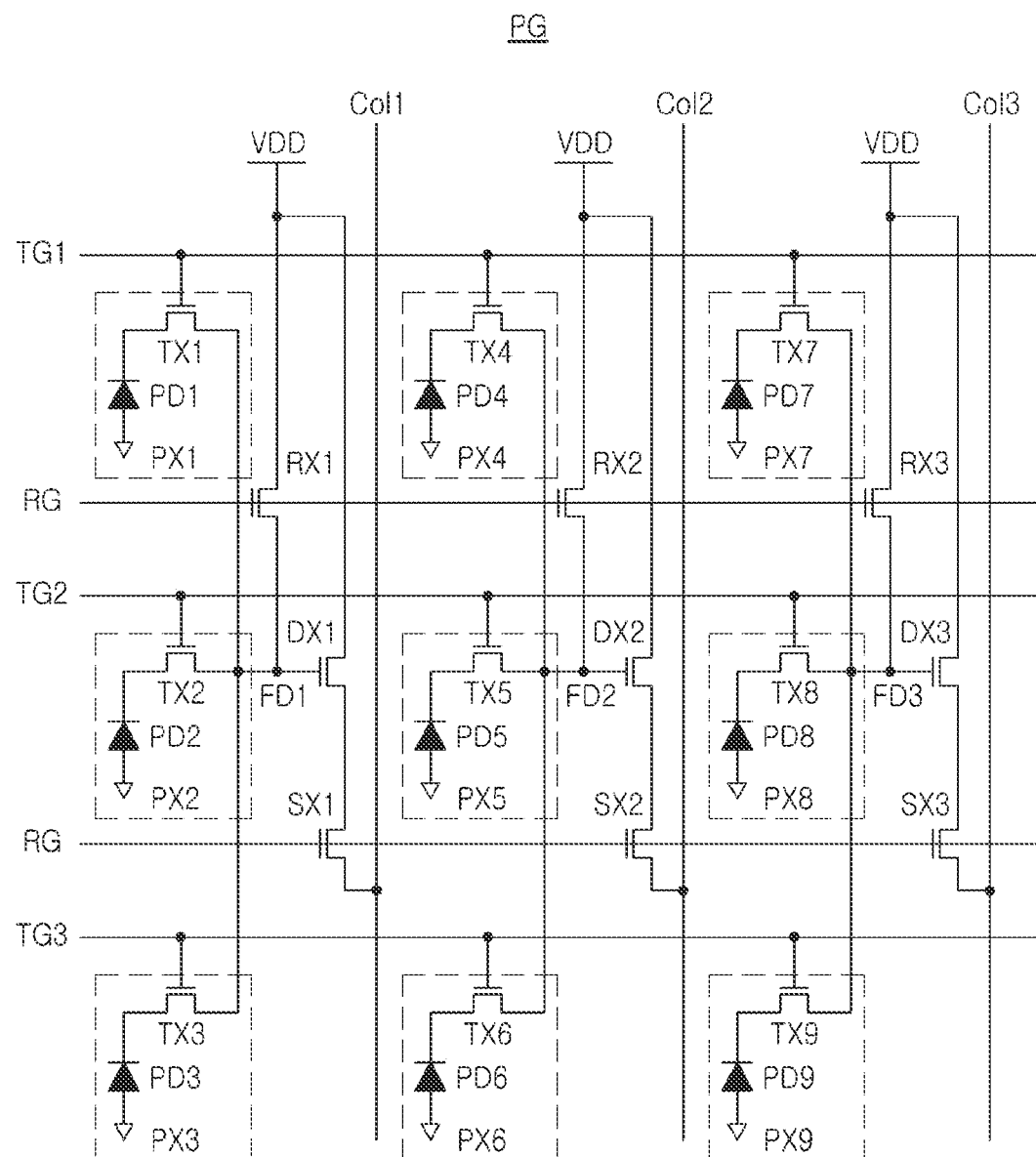
FIGS. 10A and 10B are views schematically illustrating a pixel circuit of an image sensor according to an embodiment of the present disclosure.
Figure 10B:
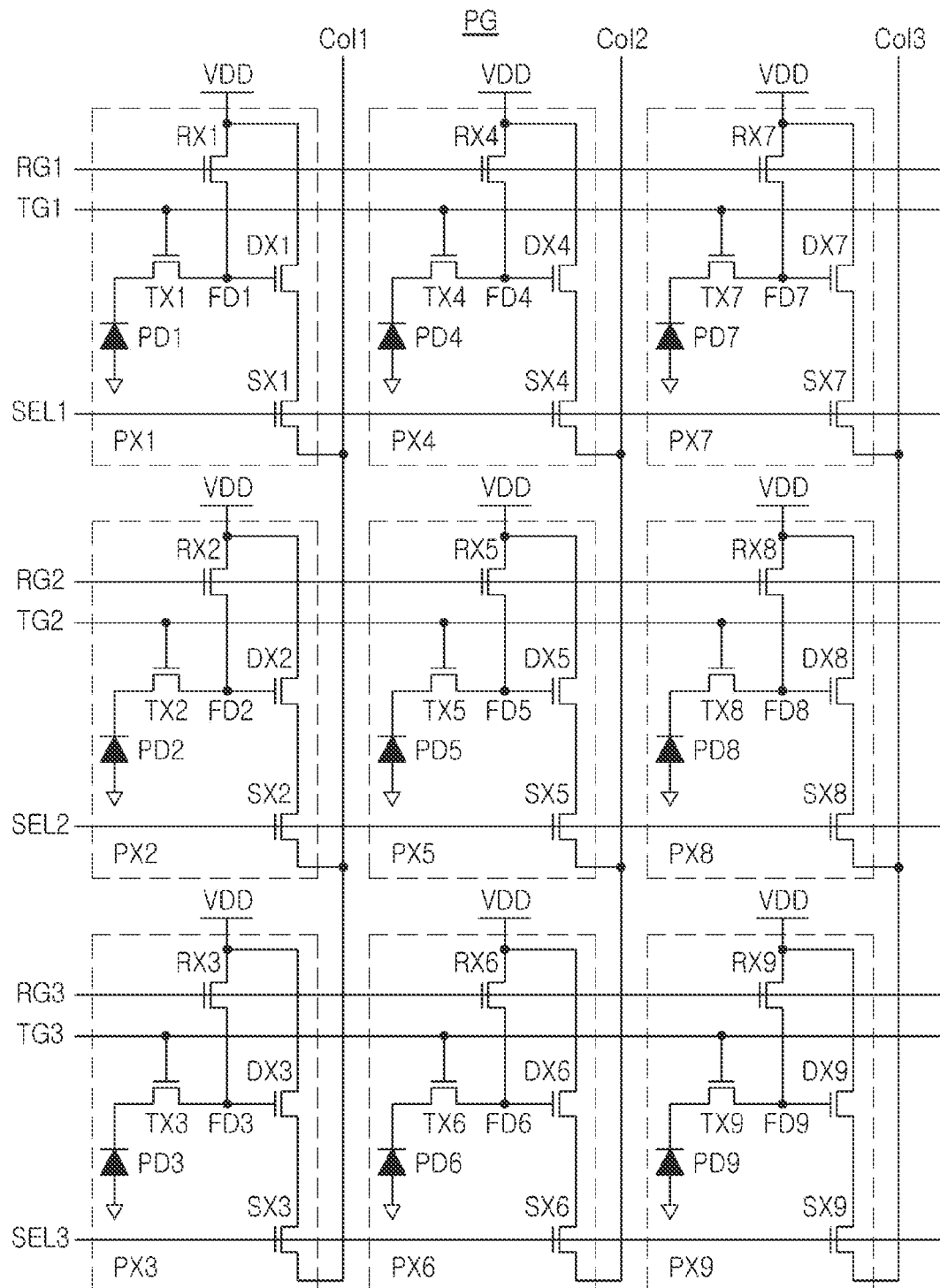

FIG. 9 is a view schematically illustrating a pixel group included in a pixel array of an image sensor according to an embodiment of the present disclosure. FIGS. 10A and 10B are views schematically illustrating a pixel circuit of an image sensor according to an embodiment of the present disclosure.

A pixel array of an image sensor according to an embodiment of the present disclosure may include a plurality of pixel groups PG1 to PG4. Referring to FIG. 9, pixel groups PG1 to PG4 according to an embodiment may include nine pixels PX1 to PX9, respectively. For example, at least one of the nine pixels PX1 to PX9 may be a color pixel, and the others thereof may be peripheral white pixels disposed around the color pixel. In an embodiment, a fifth pixel PX5 may be implemented as a color pixel, and first to fourth pixels PX1 to PX4 and sixth to ninth pixels PX6 to PX9 may be implemented as peripheral white pixels.

The pixel groups PG1 to PG4 may be disposed in the first direction (the X-axis direction) and the second direction (the Y-axis direction), and thus a first boundary BD1 and a second boundary BD2 may be defined. For example, the first boundary BD1 may be a boundary extending in the first direction, and the second boundary BD2 may be a boundary extending in the second direction.

When only the fifth pixel PX5 is implemented as a color pixel in each of the pixel groups PG1 to PG4, the first boundary BD1 and the second boundary BD2 may be defined as a boundary between the first to fourth and sixth to ninth neighboring white pixels PX1 to PX4 and PX6 to PX9. Therefore, the first boundary BD1 and the second boundary BD2 may be separated from each other, without being adjacent to the fifth pixel PX5, a color pixel.

The pixels PX1 to PX9 may include at least one photodiode and a pixel circuit generating a pixel signal corresponding to charges generated by the photodiode, respectively. According to embodiments, at least some of the pixels PX1 to PX9 in each of the pixel groups PG1 to PG4 may share at least one of elements included in the pixel circuit. Hereinafter, a pixel circuit of the pixels PX1 to PX9 included in the pixel group PG will be described with reference to FIGS. 10A and 10B.

FIGS. 10A and 10B may be diagrams illustrating pixel circuits of pixels PX1 to PX9 included in one pixel group PG. Referring to FIGS. 10A and 10B, each of the pixels PX1 to PX9 may include one of photodiodes PD1 to PD9 and one of transfer transistors TX1 to TX9. When at least one of the pixels PX1 to PX9 is provided as an autofocusing pixel for providing an autofocusing function, the autofocusing pixel may include two or more photodiodes.

First, in the embodiment illustrated in FIG. 10A, three pixels arranged in the second direction in one pixel group PG may share a floating diffusion, a reset transistor, a drive transistor, and a select transistor. Referring to FIG. 10A, in one pixel group, first to third pixels PX1 to PX3 connected to a first column line Col1 may share a first floating diffusion FD1, a first reset transistor RX1, a first drive transistor DX1, and a first select transistor SX1.

In addition, fourth to sixth pixels PX4 to PX6 connected to a second column line Col2 may share a second floating diffusion FD2, a second reset transistor RX2, a second drive transistor DX2, and a second select transistor SX2 and seventh to ninth pixels PX7 to PX9 connected to a third column line Col3 may share a third floating diffusion FD3, a third reset transistor RX3, a third drive transistor DX3, and a third select transistor SX3. Therefore, a fifth pixel PX5, which may be a color pixel, and fourth and sixth neighboring white pixels PX4 and PX6, which may be adjacent to the fifth pixel PX5 in the second direction, among the white pixels PX1 to PX4 and PX6 to PX9, may share the second floating diffusion FD2.

For example, in the embodiment illustrated in FIG. 10A, one pixel group PG may include three floating diffusions FD1 to FD3, three reset transistors RX1 to RX3, three drive transistors DX1 to DX3, and three select transistors SX1 to SX3. Therefore, a pixel circuit may be efficiently arranged in a limited area.

A logic circuit of an image sensor may drive the pixels PX1 to PX9 by a rolling shutter method and may acquire pixel signals through the column lines Col1 to Col3. For example, the floating diffusions FD1 to FD3 may be reset with a power voltage VDD by a reset control signal RG and a reset voltage may be acquired through the column lines Col1 to Col3. Thereafter, the first, fourth, and seventh transfer transistors TX1, TX4, and TX7 may be turned on by a first transmission control signal TG1 and pixel voltages corresponding to charges generated by the first, fourth, and seventh photodiodes PD1, PD4, and PD7 may be output through column lines Col1 to Col3. The logic circuit may generate a pixel signal corresponding to a difference between a reset voltage and a pixel voltage, for each of the first, fourth, and seventh pixels PX1, PX4, and PX7. The logic circuit may acquire a pixel signal for each of the pixels PX1 to PX9 by repeating the same operation as above.

In an embodiment, the logic circuit of the image sensor may drive the pixels PX1 to PX9 differently according to illuminance. For example, in a low illuminance environment in which intensity of light is weak, the logic circuit may acquire a reset voltage through the column lines Col1 to Col3 and may sequentially toggle first to third transmission control signals TG1 to TG3. Therefore, pixel voltages corresponding to charges of the first to third photodiodes PD1 to PD3 may be output through the first column line Col1, pixel voltages corresponding to charges of the fourth to sixth photodiodes PD4 to PD6 may be output through the second column line Col2, and pixel voltages corresponding to charges of the seventh to ninth photodiodes PD7 to PD9 may be output through the third column line Col3.

In a low illuminance environment, the logic circuit may simultaneously acquire pixel signals from two or more pixels (e.g., PX1 to PX9) sharing each of the column lines Col1 to Col3 and, as a result, image data may be constructed using a pixel signal for one pixel group PG. For example, a pixel signal for one pixel group PG may be acquired through the plurality of pixels PX1 to PX9 and image quality may be improved by increasing sensitivity of the image sensor. In an embodiment, image data may be generated from a pixel signal generated from a white pixel that does not include a color filter by an image signal processor (ISP) provided inside or outside the logic circuit.

Also, in an embodiment of the present disclosure, a pixel group PG may include a color pixel and a white pixel and the number of white pixels may be greater than the number of color pixels. By disposing more white pixels having relatively high sensitivity in the pixel group PG, intensity of a pixel signal may increase and sensitivity and image quality of an image sensor may be effectively improved in a low illuminance environment.

In the embodiment illustrated in FIG. 10B, pixels PX1 to PX9 included in one pixel group PG may include a floating diffusion (e.g., FD1 through FD9), a reset transistor (e.g., RX1 through RX9), a drive transistor (e.g., DX1 through DX9) and a select transistor (e.g., SX1 through SX9), respectively. In a low luminance environment, a logic circuit of an image sensor may toggle first to third reset control signals RG1 to RG3 to reset voltages of floating diffusions FD1 to FD9, to preferentially obtain reset voltages. Thereafter, the logic circuit may acquire pixel voltages through column lines Col1 to Col3 while sequentially toggling first to third transmission control signals TG1 to TG3. Therefore, in a low illuminance environment, pixel signals may be simultaneously acquired from the pixels PX1 to PX9 sharing the column lines Col1 to Col3 and an image may be configured using the pixel signal acquired for one pixel group PG. As a result, degradation of sensitivity may be prevented and image quality may be improved, in a low illuminance environment.

In a high illuminance environment, a photodiode of a white pixel may be saturated due to strong intensity of light. In an embodiment of the present disclosure, an image may be composed only of pixel signals acquired from color pixels in a high luminance environment. In order to compose an image using only pixel signals acquired from color pixels, the logic circuit may use a remosaic method.

Figure 11:
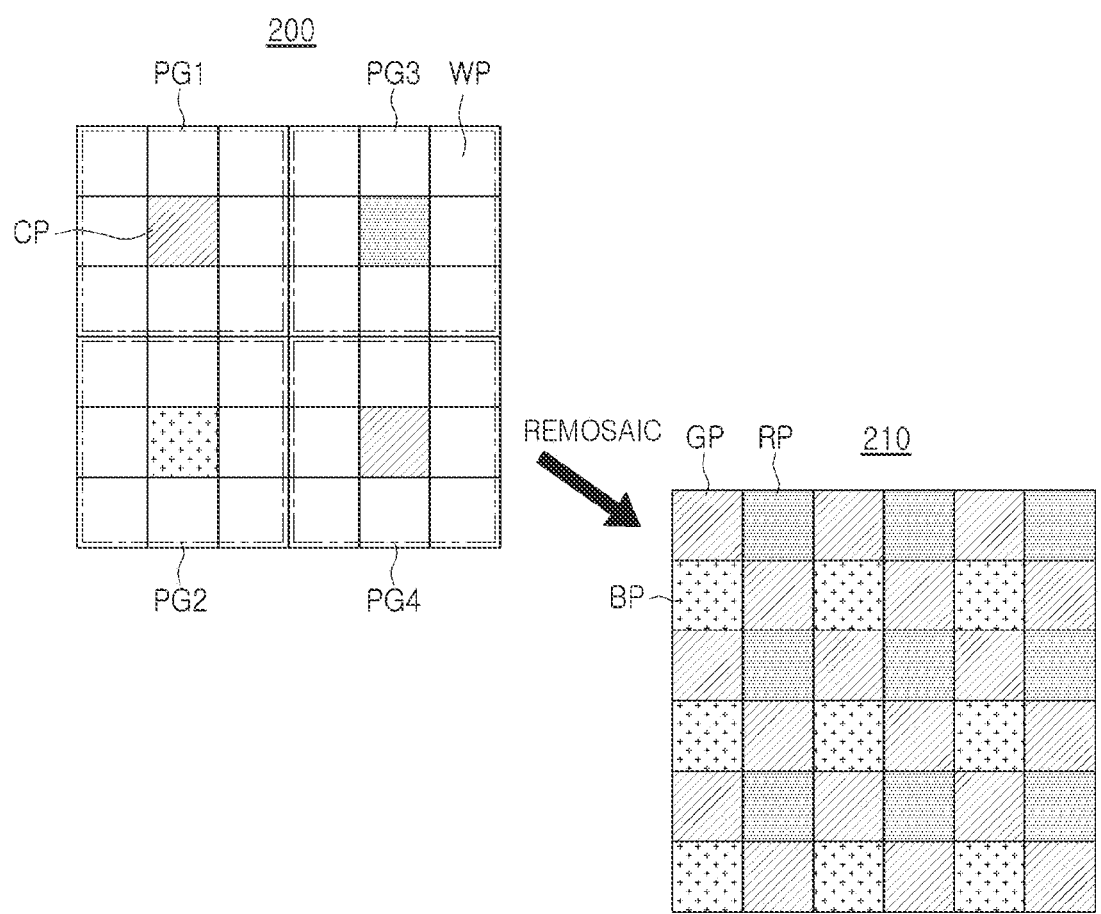
FIGS. 11 and 12 are views illustrating an operation of an image sensor according to an embodiment of the present disclosure.
Figure 12:
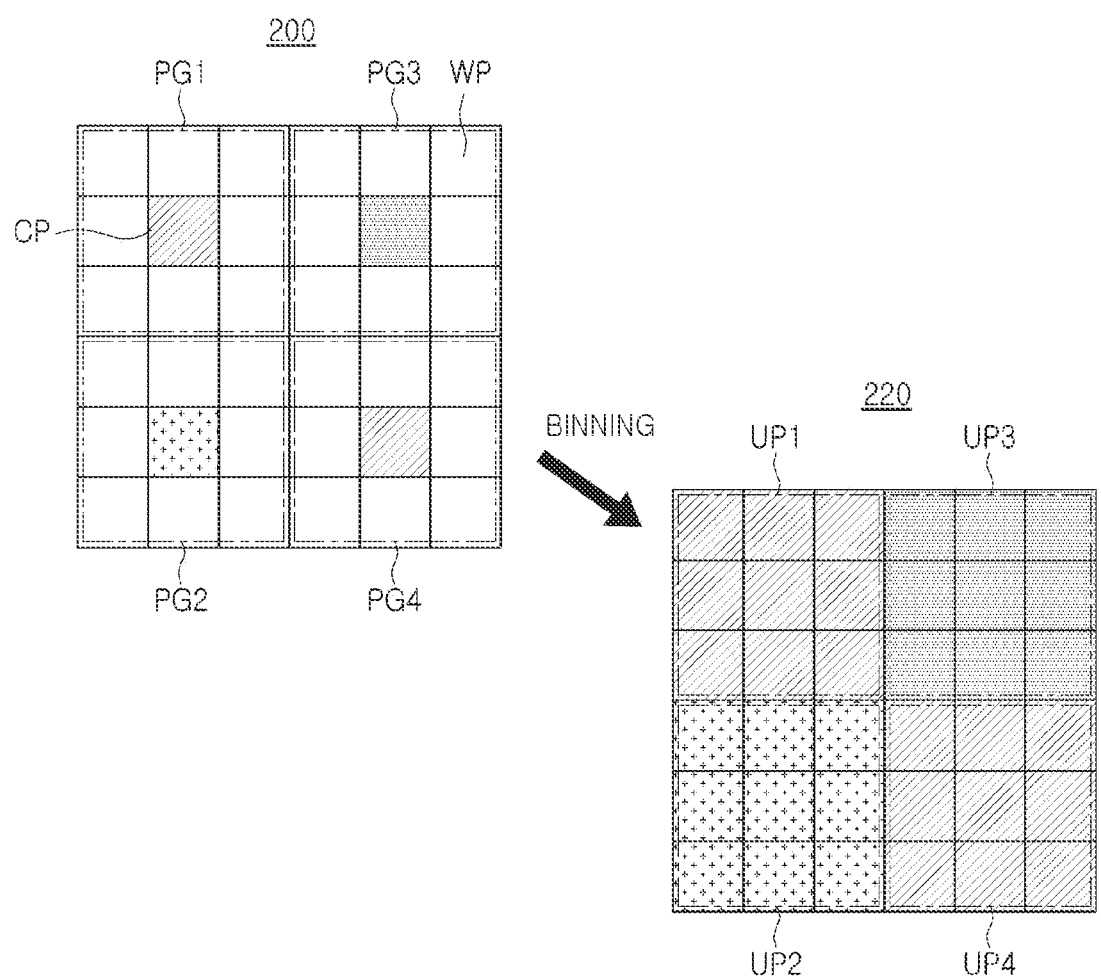

FIGS. 11 and 12 are views illustrating an operation of an image sensor according to an embodiment of the present disclosure.

FIG. 11 may be a diagram illustrating an operation of an image sensor in a high illuminance environment having a relatively large amount of light, and FIG. 12 may be a diagram illustrating an operation of an image sensor in a low illuminance environment having a relatively small amount of light. Referring first to FIG. 11, a pixel array 200 may include a color pixel CP and a white pixel WP. Pixel groups PG1 to PG4 may include nine pixels arranged in a 3×3 form, respectively, and may include, for example, one color pixel CP and eight white pixels WP, respectively.

When an image sensor is operated in a high illuminance environment, in the white pixel WP having relatively high sensitivity, compared to the color pixel CP, a phenomenon in which a photodiode is saturated may occur even when the same exposure time period is applied. Therefore, when external illuminance is equal to or greater than a predetermined threshold value, an image sensor may acquire a pixel signal only from a color pixel CP. When an image is composed only of a pixel signal only from a color pixel CP, resolution of the image may be lowered, compared to the number of pixels included in the pixel array 200.

For example, the pixel array 200 may include 120,000 color pixels CP and 960,000 white pixels WP. In the above example, the number of the color pixels CP and the number of the white pixels WP may be determined in consideration of a ratio of cone cells for distinguishing colors of light and rod cells for distinguishing intensity of the light in a human eye. Therefore, when an image is generated using only a pixel signal acquired from the color pixel CP, resolution of the image may be reduced, compared to the number of pixels included in the pixel array 200.

In an embodiment of the present disclosure, a decrease in resolution may be prevented by performing a remosaic method for a pixel signal by an image sensor and generating an image in a high illuminance environment. The image sensor may convert a pixel signal acquired from the color pixel CP of the pixel array 200 into pixel data that may be digital data. The remosaic method may include an operation of rearranging sequences of pixel data acquired from the color pixels CP.

Referring to FIG. 11, pixel data acquired from the color pixels CP may be rearranged according to a pattern of the color pixels CP included in the pixel array 200. Therefore, image data 210 having the same resolution as the number of pixels included in the pixel array 200 may be generated. The image data 210 may be configured to include a green pixel GP, a red pixel RP, and a blue pixel BP. In an embodiment illustrated in FIG. 11, since the color pixels CP may be arranged in a Bayer pattern in the pixel array 200, the green pixel GP, the red pixel RP, and the blue pixel BP included in the image data 210 may also be arranged in a Bayer pattern.

Next, referring to FIG. 12, a pixel array 200 may include a color pixel CP and a white pixel WP. Pixel groups PG1 to PG4 may include nine pixels arranged in a 3×3 form, respectively, and may include, for example, one color pixel CP and eight white pixels WP, respectively.

When an image sensor is operated in a low illuminance environment, image quality may be improved by using a pixel signal output from the white pixel WP having relatively high sensitivity, compared to the color pixel CP. The image sensor may determine a case in which external illuminance is equal to or less than a predetermined threshold value, as a low illuminance environment, and may acquire pixel signals from the color pixel CP and the white pixel WP.

In order to increase sensitivity of an image generated by capturing an image of a subject in a low illuminance environment, the image sensor may acquire pixel signals corresponding to each of the pixel groups PG1 to PG4. In this case, a pixel signal generated from the white pixel WP not including a color filter may be processed by an image signal processor. In an embodiment, the image signal processor may process a pixel signal generated from the white pixel WP, based on a color of a color filter of the color pixel CP included in each of the pixel groups PG1 to PG4, to acquire a pixel signal corresponding to each of the pixel groups PG1 to PG4.

In a low illuminance environment, since an amount of light introduced from the subject may be small, it may be difficult for a logic circuit of the image sensor to secure pixel data having sufficient information from each of the pixels of the pixel array 200. In an embodiment of the present disclosure, since a pixel signal may be generated as a unit in each of the pixel groups PG1 to PG4, the logic circuit may acquire data having sufficient information to represent the subject.

For example, the color pixel CP and the white pixel WP included in the first pixel group PG1 may be defined as a first unit pixel UP1. The logic circuit of the image sensor may be connected to the first pixel group PG1 through three column lines and may sum pixel signals acquired through the three column lines. The logic circuit may acquire a first pixel signal corresponding to the first unit pixel UP1 as a result of the summation. An analog binning operation, similar to the above, may be also performed on the second to fourth pixel groups PG2 to PG4. Therefore, logic circuit may acquire second to fourth pixel signals corresponding to second to fourth unit pixels UP2 to UP4. Thereafter, after processing the pixel signal by the image signal processor or the like in consideration of a color of a color filter of the color pixel CP included in each of the pixel groups PG1 to PG4, image data may be configured.

Therefore, resolution of image data 220 generated in a low luminance environment may be smaller than the number of pixels included in the pixel array 200. For example, resolution of the image data 220 may correspond to the number of pixel groups PG1 to PG4 included in the pixel array 200. While resolution of the image data 220 may be reduced, since sensitivity of the image sensor may be maximized in a low illuminance environment, a subject may be accurately expressed.

In addition, in an embodiment of the present disclosure, since pixel groups PG1 to PG4 may be implemented to include a color pixel CP and a white pixel WP, respectively, sensitivity of an image sensor may be more effectively secured in a low luminance environment. As described above, the number of white pixels WP may be greater than the number of color pixels CP and the number of white pixels WP may be an integer multiple of the number of color pixels CP. In an embodiment, the number of white pixels WP may be 4 times or more of the number of color pixels CP, and the number of white pixels WP may be eight or more times the number of color pixels CP, in consideration of the number of cone cells and rod cells, present in a human eye. The number of white pixels WP and the number of color pixels CP may be variously modified, depending on the number of pixels included in each of the pixel groups PG1 to PG4 and arrangement of the white pixels WP and the color pixels CP.

FIGS. 13A to 14B are views illustrating an operation of an image sensor according to an embodiment of the present disclosure.

Figure 13A:
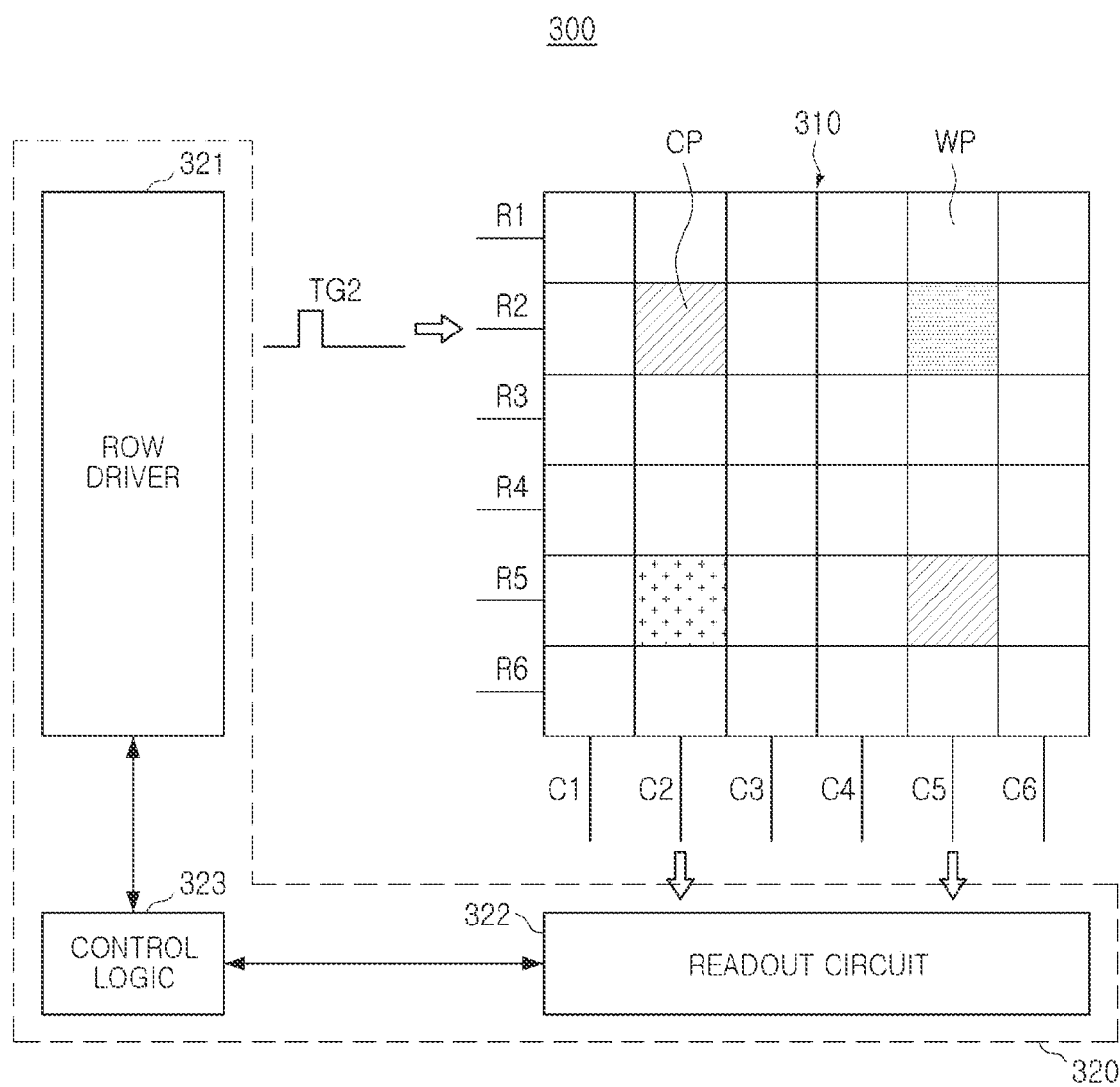
FIGS. 13A, 13B, 14A, and 14B are views illustrating an operation of an image sensor according to an embodiment of the present disclosure.
Figure 13B:
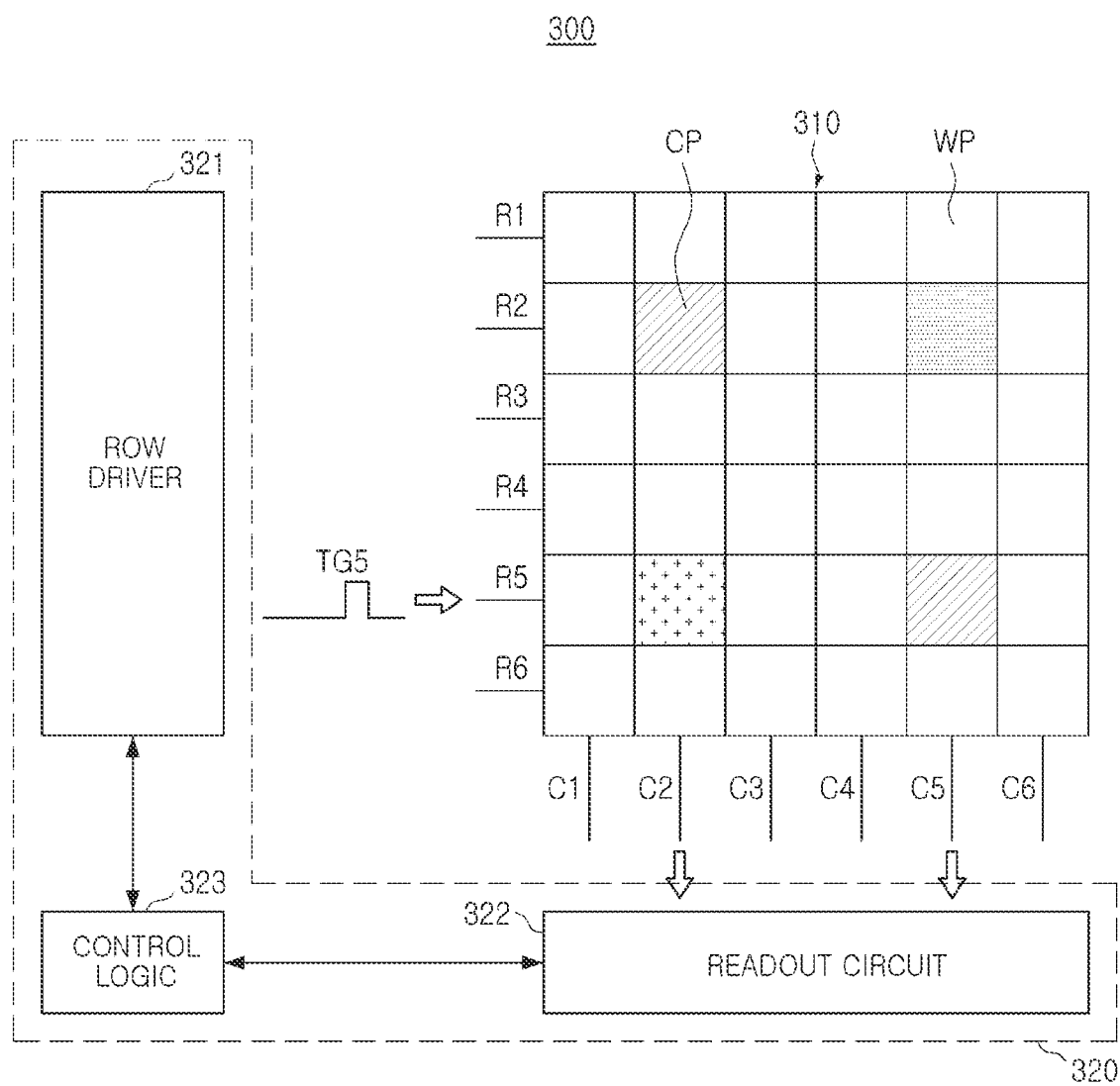

First, FIGS. 13A and 13B may be diagrams illustrating an operation of an image sensor in a high illuminance environment. Referring to FIGS. 13A and 13B, an image sensor 300 may include a pixel array 310 and a logic circuit 320. The pixel array 310 may include a plurality of pixels, and the plurality of pixels may include a color pixel CP and a white pixel WP. Arrangement of the color pixel CP and the white pixel WP in the pixel array 310 may be variously modified according to embodiments.

The logic circuit 320 may include a row driver 321, a readout circuit 322, and a control logic 323. The row driver 321 may be connected to the plurality of pixels through a plurality of row lines R1 to R6, and the readout circuit 322 may be connected to the plurality of pixels through a plurality of column lines C1 to C6.

In embodiments illustrated in FIGS. 13A and 13B, the pixel circuits of the color pixel CP and the white pixel WP may be the same as described above with reference to FIG. 10A or 10B. For example, a color pixel CP may provide one pixel group together with eight white pixels WP disposed around the color pixel CP. Three pixels in the pixel group, connected to one of the column lines C1 to C6, may share a floating diffusion, a reset transistor, a drive transistor, a select transistor, or the like. Alternatively, a color pixel CP and a white pixel WP may include a floating diffusion, a reset transistor, a drive transistor, or a select transistor, respectively.

Since the white pixel WP may have relatively high sensitivity compared to the color pixel CP, the white pixel WP may be saturated relatively quickly when exposed to light for the same exposure time period in a high luminance environment. Therefore, in an embodiment of the present disclosure, in a high illuminance environment in which the white pixel WP is expected to be easily saturated, the image sensor 300 may only generate image data with a pixel signal acquired from the color pixel CP.

First, referring to FIG. 13A, a second row line R2, which may be a first row line to which a color pixel CP is connected, among the row lines R1 to R6, may be activated. The row driver 321 may input a second transmission control signal TG2 to the second row line R2. In response to the second transmission control signal TG2, a transfer transistor may be turned on in a color pixel CP and a white pixel WP, connected to the second row line R2, and charges generated by a photodiode may move to a floating diffusion.

The readout circuit 322 may acquire a pixel voltage from the color pixel CP and the white pixel WP, connected to the second row line R2 through the plurality of column lines C1 to C6. The readout circuit 322 may generate a pixel signal corresponding to a difference between the pixel voltage and a reset voltage acquired through the plurality of column lines C1 to C6, before the second transmission control signal TG2 is input. In some embodiments, the readout circuit 322 may acquire a reset voltage and a pixel voltage only through some column lines C2 and C5 to which the color pixel CP is connected and may generate a pixel signal.

Next, referring to FIG. 13B, the row driver 321 may activate a fifth row line R5, which may be a second row line to which a color pixel CP is connected among the row lines R1 to R6. In response to a fifth transmission control signal TG5, a transfer transistor may be turned on in a color pixel CP and a white pixel WP, connected to the fifth row line R5 and charges generated by a photodiode may move to a floating diffusion.

The readout circuit 322 may acquire a pixel voltage from the color pixel CP and the white pixel WP connected to the fifth row line R5 through the plurality of column lines C1 to C6. The readout circuit 322 may generate a pixel signal corresponding to a difference between the pixel voltage and a reset voltage acquired through the plurality of column lines C1 to C6, before the fifth transmission control signal TG5 is input. In some embodiments, the readout circuit 322 may acquire a reset voltage and a pixel voltage only through some column lines C2 and C5 to which the color pixel CP is connected and may generate a pixel signal.

As described with reference to FIGS. 13A and 13B, the pixel signal acquired from the color pixel CP may be converted into pixel data, which may be digital data. The control logic 323 may perform a remosaic operation of rearranging the pixel data to generate image data. The remosaic operation may be similar to that described with reference to FIG. 11. For example, the control logic 323 may generate image data by rearranging pixel data according to arrangement of color pixels CP included in the pixel array 310.

Figure 14A:
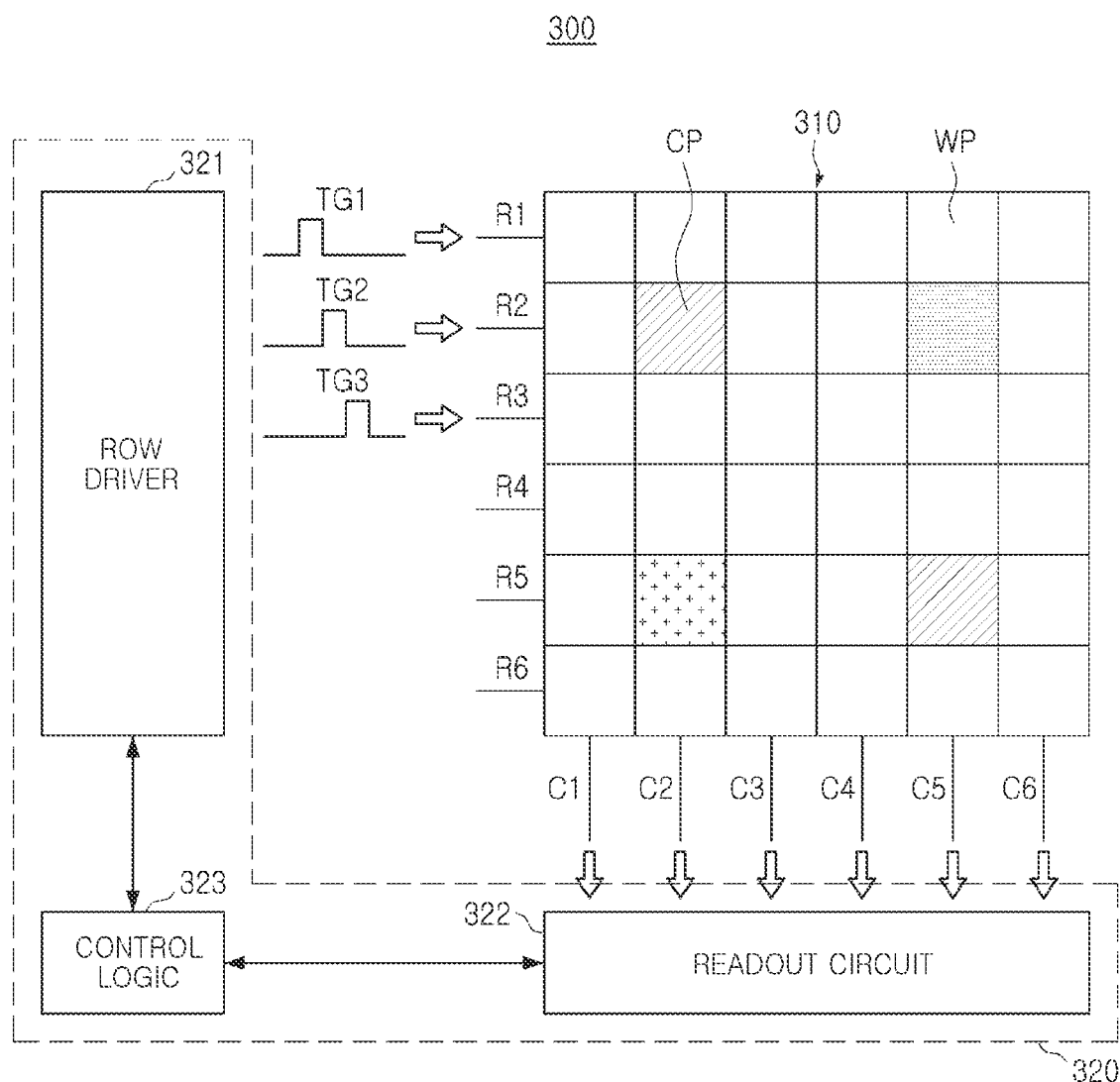
Figure 14B:
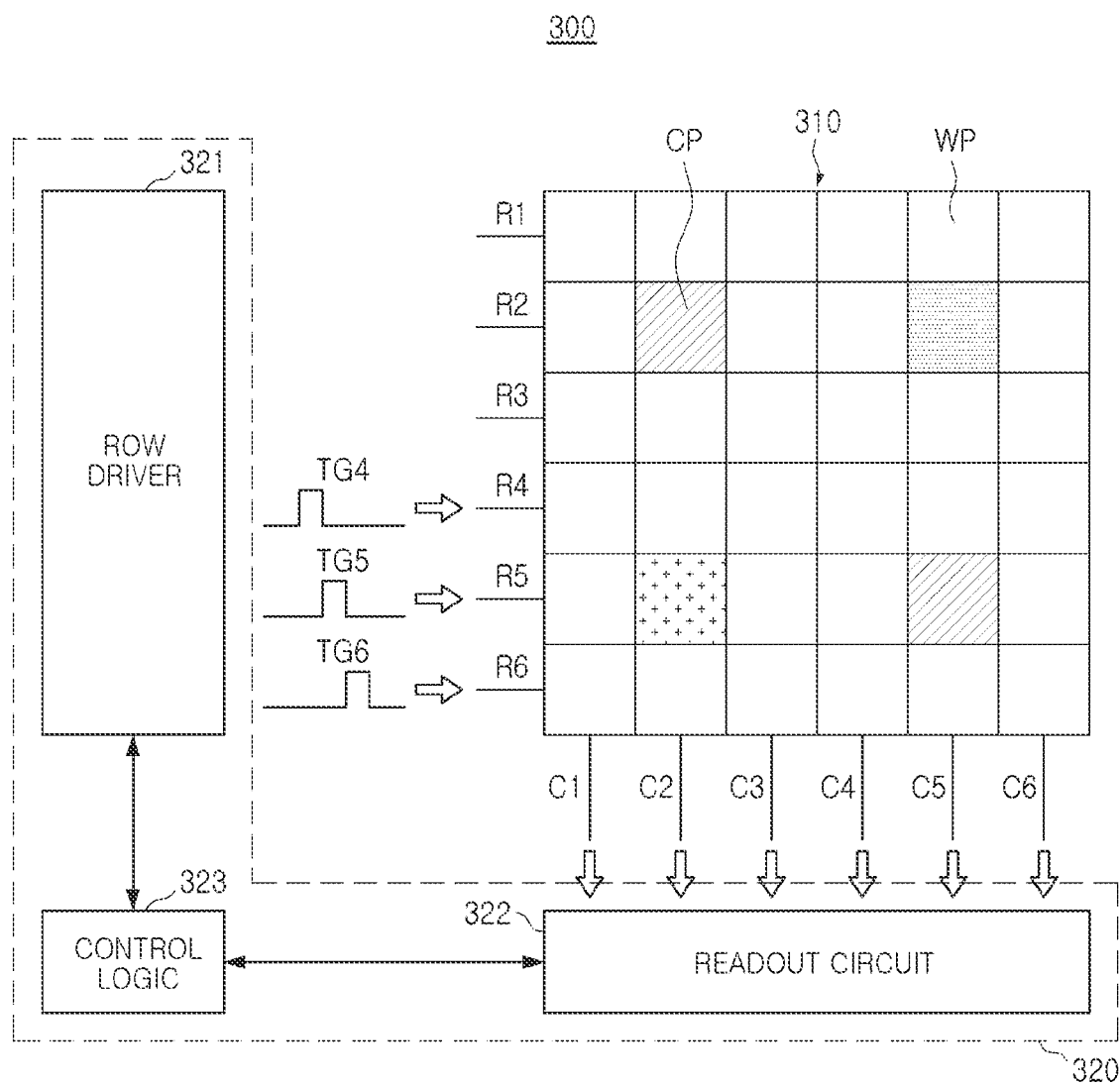

Next, FIGS. 14A and 14B may be diagrams illustrating an operation of an image sensor in a low illuminance environment. As described above, since a white pixel WP may have relatively high sensitivity compared to a color pixel CP, image data may be generated using a pixel signal acquired from the white pixel WP in a low illuminance environment to improve quality of an image. For example, a readout circuit 322 may sum up pixel voltages of a portion of pixels respectively connected to a plurality of column lines C1 to C6, to use a pixel signal from the white pixel WP to generate image data. Since the white pixel WP does not include a color filter, the pixel signal may be processed by an image signal processor and may be then converted into image data.

Pixels included in a pixel array 310 may be driven in units of pixel groups. In the embodiment illustrated in FIGS. 14A and 14B, a pixel group may include nine pixels arranged in a 3×3 form. First, referring to FIG. 14A, first to third control signals TG1 to TG3 may be sequentially input to first to third row lines R1 to R3 connected to first pixel groups. The readout circuit 322 may sequentially acquire pixel voltages of pixels connected to the first row line R1, pixel voltages of pixels connected to the second row line R2, and pixel voltages of pixels connected to the third row line R3 through the column lines C1 to C6.

Alternatively, in each of the pixel groups, three pixels connected to each of the column lines C1 to C6 are configured to share a floating diffusion and a drive transistor and charges of photodiodes included in the three pixels may be accumulated in the floating diffusion by the first to third control signals TG1 to TG3. The readout circuit 322 may acquire pixel voltages for the three pixels connected to each of the column lines C1 to C6. In addition, the readout circuit 322 may sum up pixel voltages acquired from the first to third column lines C1 to C3 and may sum up pixel voltages acquired from the fourth to sixth column lines C4 to C6, in consideration of shapes of the pixel groups.

Next, referring to FIG. 14B, fourth to sixth control signals TG4 to TG6 may be sequentially input to fourth to sixth row lines R4 to R6 connected to second pixel groups. The readout circuit 322 may sequentially acquire pixel voltages of pixels connected to the fourth row line R4, pixel voltages of pixels connected to the fifth row line R5, and pixel voltages of pixels connected to the sixth row line R6 through the column lines C1 to C6. The readout circuit 322 may sum up at least a portion of pixel voltages acquired through the column lines C1 to C6 in consideration of shapes of the pixel groups.

Image data generated from a pixel signal in a low luminance environment may be generated as described with reference to FIG. 12. For example, nine pixels connected to the first to third row lines R1 to R3 and the first to third column lines C1 to C3 may be defined as one unit pixel. The control logic 323 may generate image data using unit pixels defined as nine pixels adjacent to each other in a 3×3 form as described above. Therefore, although resolution of pixels included in the pixel array 310 is lower than the number thereof, a high-quality image in which a subject is accurately expressed even in a low luminance environment may be provided.

Figure 15:
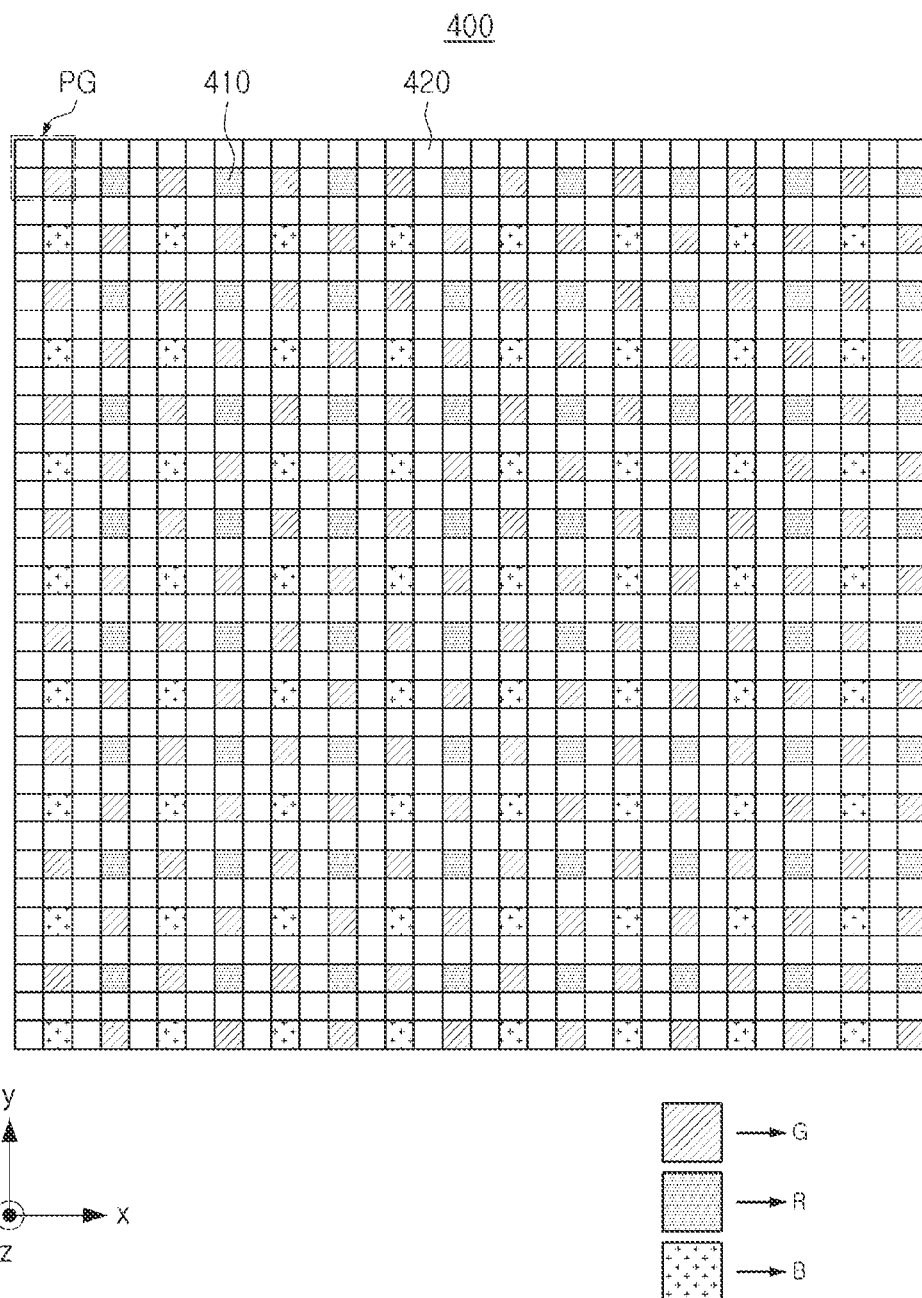
FIG. 15 is a view schematically illustrating a pixel array of an image sensor according to an embodiment of the present disclosure.

FIG. 15 is a view schematically illustrating a pixel array of an image sensor according to an embodiment of the present disclosure.

Referring to FIG. 15, a pixel array 400 of an image sensor according to an embodiment of the present disclosure may include a plurality of pixels 410 and 420 arranged in the first direction (the X-axis direction) and the second direction (the Y-axis direction). The pixel array 400 may include a color pixel 410 and a white pixel 420, and the number of color pixels 410 and the number of white pixels 420 may be variously changed. For example, the number of white pixels 420 may be greater than the number of color pixels 410. In the embodiment illustrated in FIG. 15, the number of white pixels 420 may be three times the number of color pixels 410.

The color pixel 410 may provide a pixel group PG, together with peripheral white pixels disposed around the color pixel 410 among the white pixels 420. Referring to FIG. 15, one color pixel 410 may provide one pixel group PG, together with three peripheral white pixels. In each of the pixel groups PG, the color pixels 410 may be disposed at the same position.

The color pixel 410 may include a color filter selectively passing light of a specific wavelength. For example, the color filter may pass one of red, green, and blue light. Referring to FIG. 15, a color pixel 410 included in one pixel group PG may include a color filter having a color different from that of a color pixel 410 included in another pixel group PG, adjacent in the first direction or the second direction. Color pixels 410 included in the four pixel groups PG disposed adjacent to each other in a 2×2 form in the first direction and the second direction may include two green color pixels, one red color pixel, and one blue color pixel, and may configure a Bayer pattern.

According to embodiments, the color pixel 410 may provide an autofocusing function. To this end, the color pixel 410 may include a plurality of photodiodes separated in at least one of the first direction or the second direction. In some embodiments, the white pixel 420 may also include a plurality of photodiodes to provide an autofocusing function.

Figure 16A:
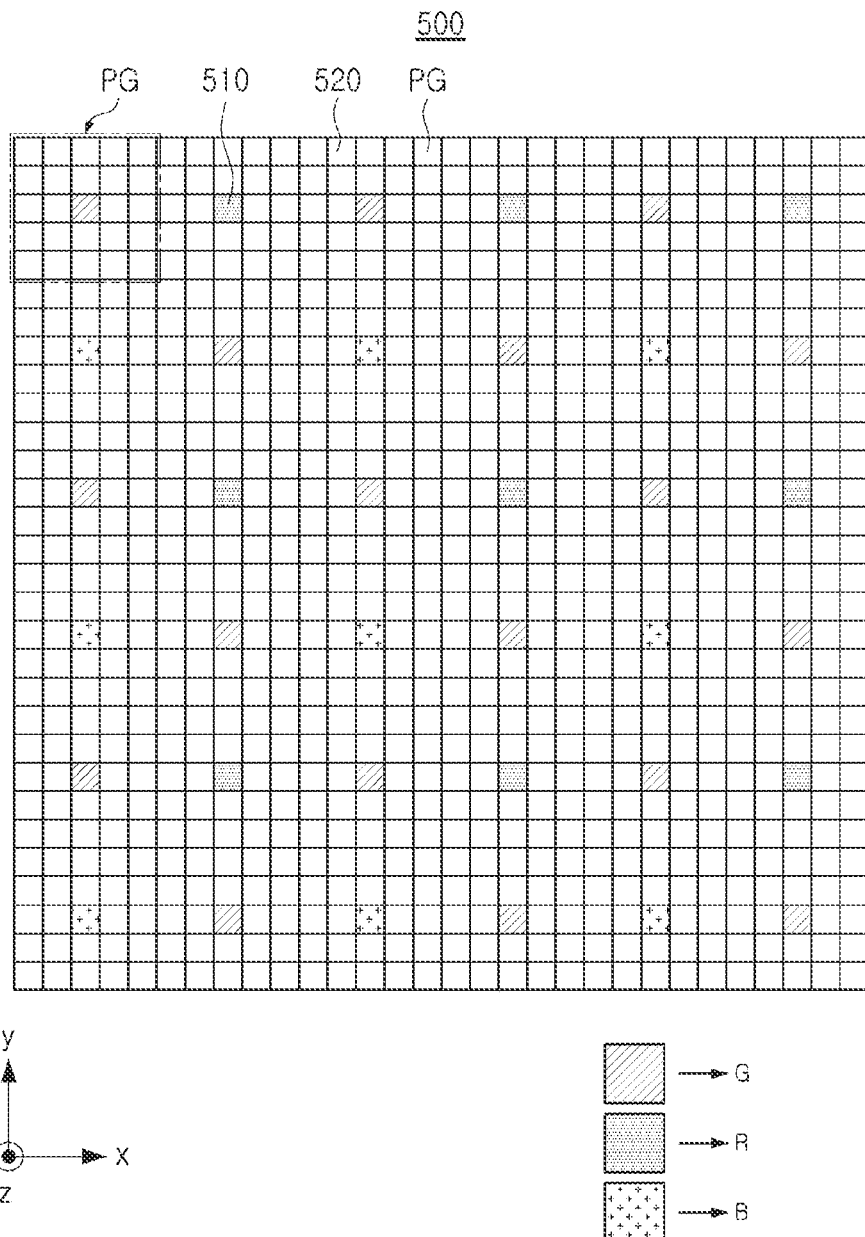
FIGS. 16A to 16C are views schematically illustrating a pixel array of an image sensor according to an embodiment of the present disclosure.
Figure 16B:
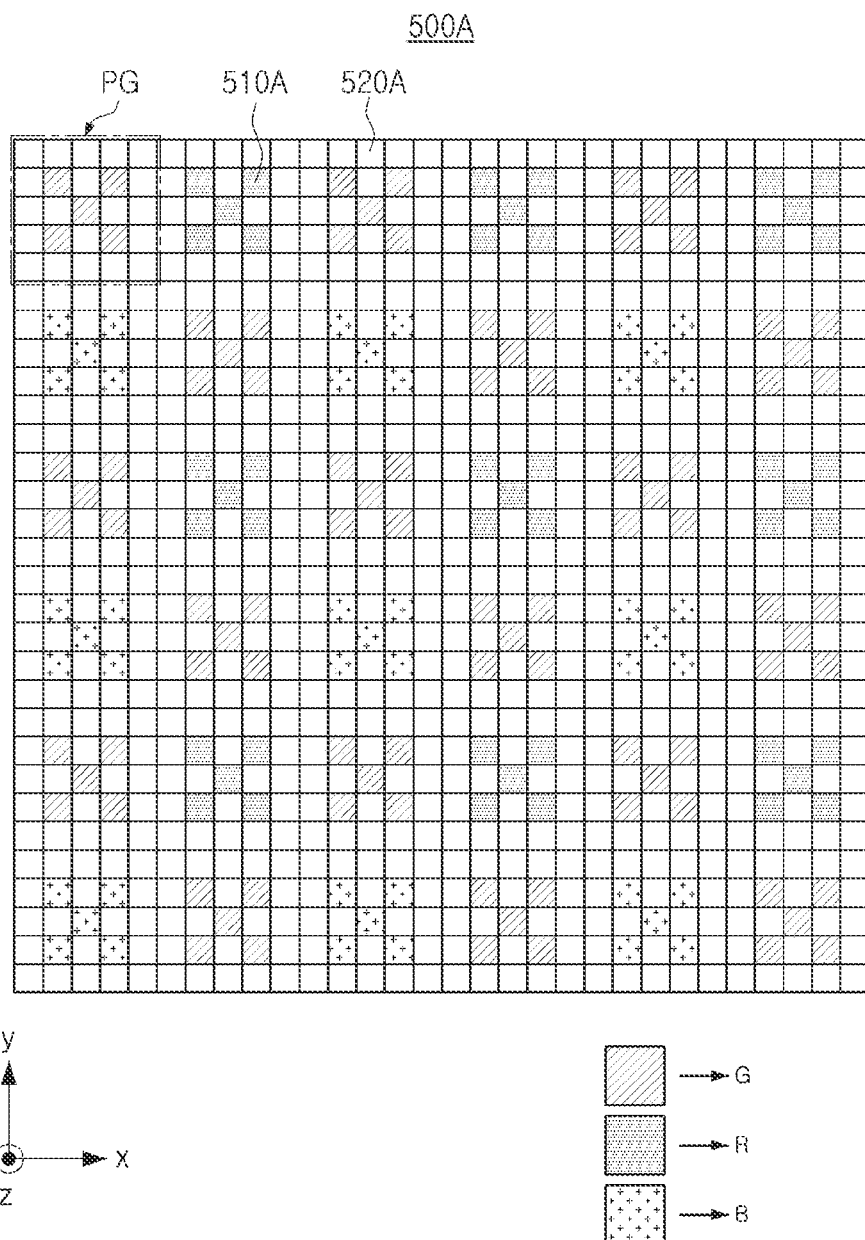
Figure 16C:
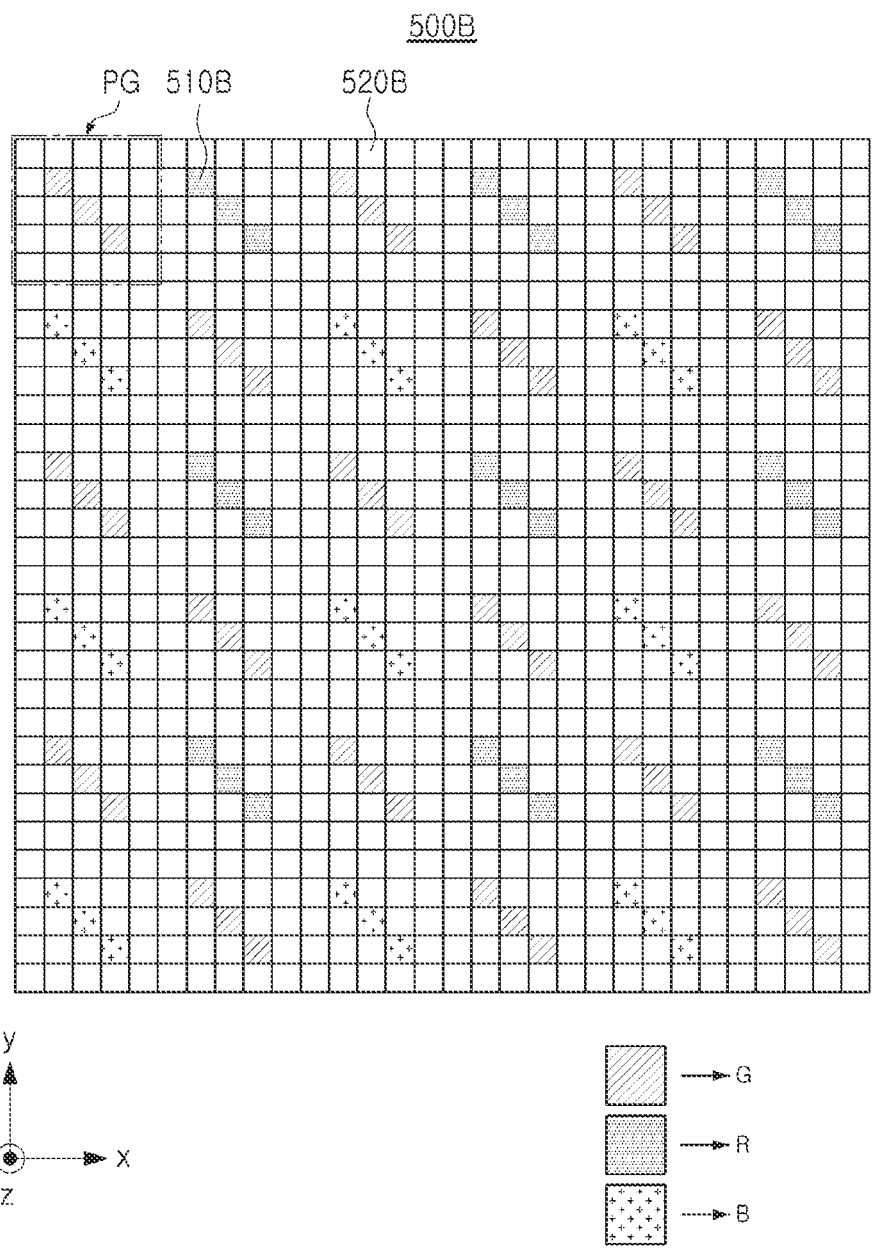

FIGS. 16A to 16C are views schematically illustrating a pixel array of an image sensor according to an embodiment of the present disclosure.

In embodiments illustrated in FIGS. 16A to 16C, pixel arrays 500, 500A, and 500B of image sensors may include pixel groups PG and each of the pixel groups PG may include a plurality of pixels arranged in a 5×5 form. Each of the pixel groups PG may include a color pixel 510, 510A, or 510B and a white pixel 520, 520A, or 520B, and the number of respective color pixels 510, 510A, and 510B may be less than the number of respective white pixels 520, 520A, and 520B.

First, referring to FIG. 16A, each of the pixel groups PG may include a color pixel 510 and white pixels 520 disposed around the color pixel 510. In the embodiment illustrated in FIG. 16A, the color pixel 510 and the white pixels 520 may be disposed in the pixel array 500 at a ratio of 1:24. A color pixel 510 may be disposed in a central portion of each of the pixel groups PG, and white pixels 520 may be disposed in a peripheral portion of each of the pixel groups PG. As illustrated in FIG. 16A, the color pixel 510 may be disposed in the central portion of each of the pixel groups PG, and an effect of cross-talk may be minimized.

Configuration of a pixel circuit in the pixel array 500 may be similar to that described above with reference to FIG. 10A or 10B. For example, in each of the pixel groups PG, five pixels disposed at the same position in the first direction (the X-axis direction) may be connected to one column line extending in the second direction (the Y-axis direction) and may share a floating diffusion, a drive transistor, or the like. When an image sensor captures an image of a subject in a low illuminance environment, pixel voltages corresponding to charges generated by photodiodes included in the five pixels may be output through each of the column lines. Therefore, sensitivity of an image sensor may be improved and an image accurately representing a subject may be generated even in a low illuminance environment.

Referring to FIG. 16B, each of the pixel groups PG may include five color pixels 510A and white pixels 520A disposed around the five color pixels 510A. In the embodiment illustrated in FIG. 16B, the color pixels 510A and the white pixels 520A may be arranged in the pixel array 500A at a ratio of 1:4. In each of the pixel groups PG, the five color pixels 510A may be arranged in an X-shape. Alternatively, the five color pixels 510A may be arranged in a cross shape.

Next, referring to FIG. 16C, each of the pixel groups PG may include three color pixels 510B and white pixels 520B disposed around the three color pixels 510B. In the embodiment illustrated in FIG. 16C, a ratio of the number of color pixels 510B to the number of white pixels 520B may be 3:22. Although it is illustrated that color pixels 510B are disposed in the same diagonal direction in pixel groups PG, color pixels 510B may be disposed in different diagonal directions in at least a portion of the pixel groups PG.

In the embodiments illustrated in FIGS. 16A to 16C, the color pixels 510, 510A, and 510B may provide an autofocusing function. For example, each of the color pixels 510, 510A, and 510B may include a plurality of photodiodes separated in at least one of a first direction or a second direction. In some embodiments, each of the white pixels 520, 520A, and 520B may also include a plurality of photodiodes to provide an autofocusing function.

In addition, color pixels and white pixels may be combined in different amounts from the embodiments illustrated in FIGS. 16A to 16C. For example, nine color pixels may be arranged in a 3×3 form, and sixteen peripheral white pixels may be arranged in a form surrounding the color pixels.

Figure 17A:
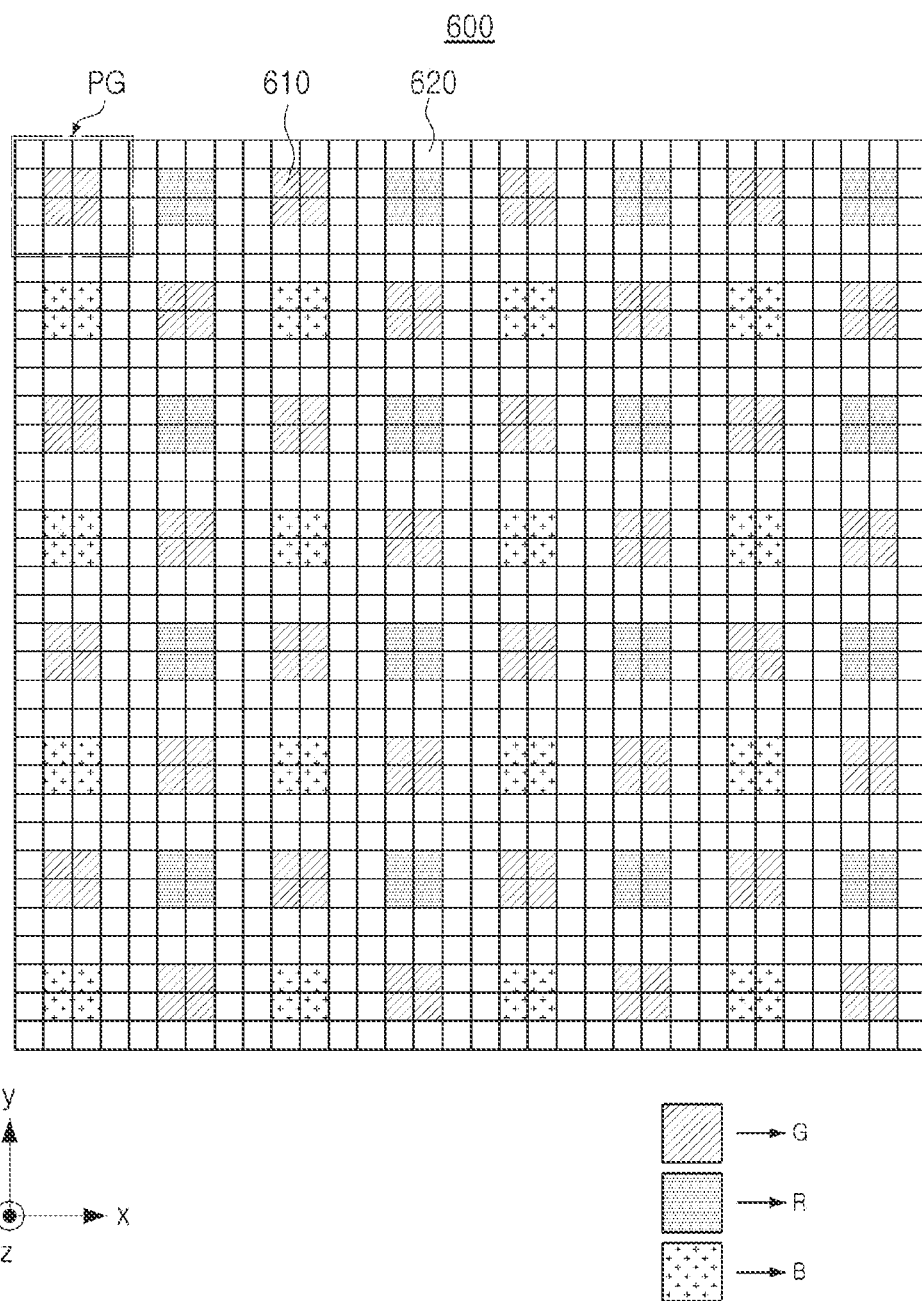
FIGS. 17A and 17B are views schematically illustrating a pixel array of an image sensor according to an embodiment of the present disclosure.
Figure 17B:
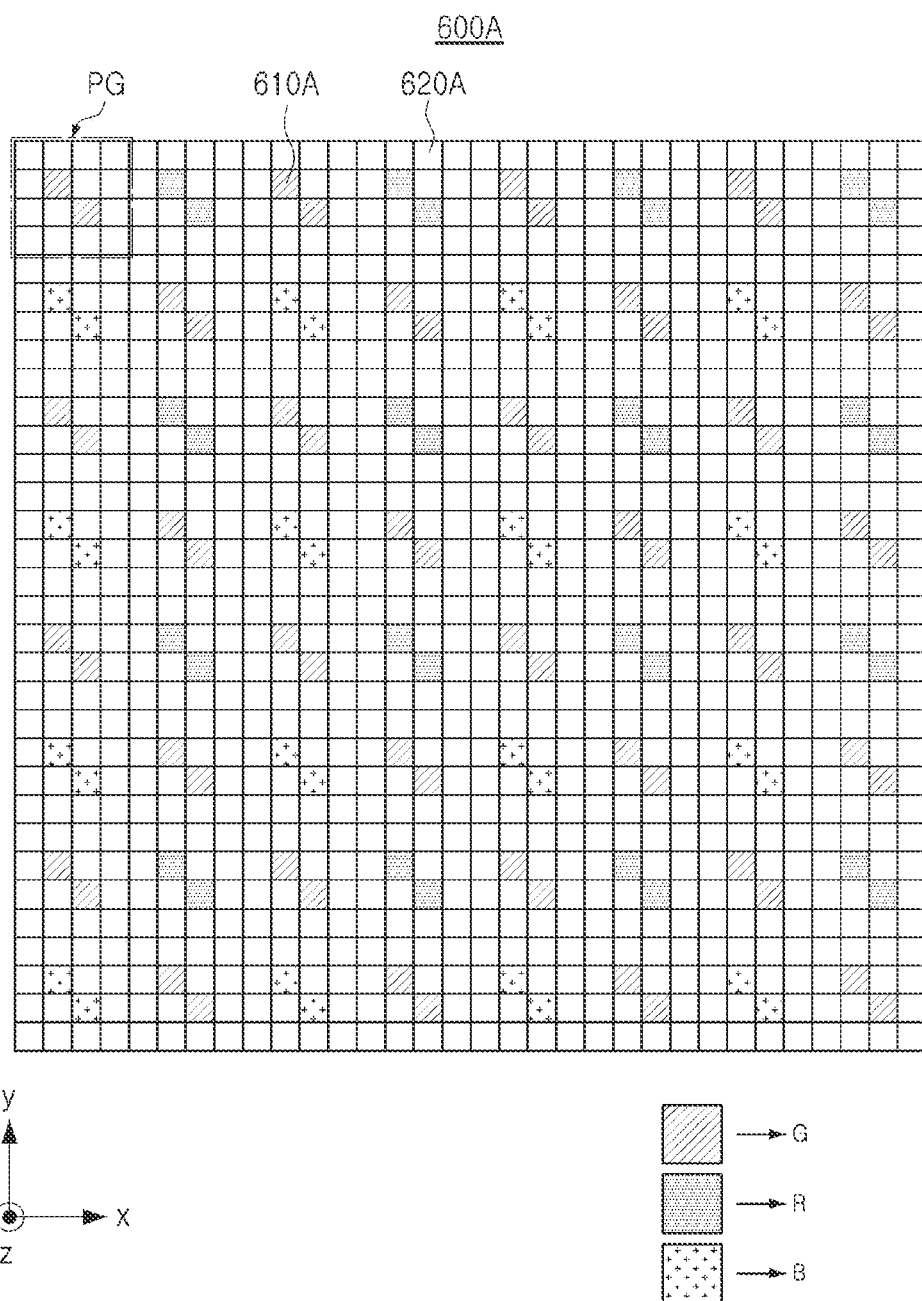

FIGS. 17A and 17B are views schematically illustrating a pixel array of an image sensor according to an embodiment of the present disclosure.

In embodiments illustrated in FIGS. 17A and 17B, pixel arrays 600 and 600A of image sensors may include pixel groups PG and each of the pixel groups PG may include a plurality of pixels arranged in a 4×4 form. Each of the pixel groups PG may include a color pixel 610 or 610A and a white pixel 620 or 620A, and the number of respective color pixels 610 and 610A may be smaller than the number of respective white pixels 620 and 620A. In the embodiments illustrated in FIGS. 17A and 17B, at least one of the color pixels 610 and 610A and the white pixels 620 and 620A may include a plurality of photodiodes to provide an autofocusing function.

First, referring to FIG. 17A, each of the pixel groups PG may include four color pixels 610 and twelve white pixels 620 disposed around the four color pixels 610. Therefore, in the embodiment illustrated in FIG. 17A, the color pixels 610 and the white pixels 620 may be arranged in the pixel array 600 at a ratio of 1:4. Color pixels 610 may be disposed in a central portion of each of the pixel groups PG, white pixels 620 may be disposed in a peripheral portion of each of the pixel groups PG, and an effect of cross-talk may be minimized.

Referring to FIG. 17B, each of the pixel groups PG may include two color pixels 610A and fourteen white pixels 620A disposed around the two color pixels 610A. Therefore, in the embodiment illustrated in FIG. 17B, the color pixels 610A and the white pixels 620A may be arranged in the pixel array 600A at a ratio of 1:7. Although it is illustrated that two color pixels 610A are disposed in the same diagonal direction in each of the pixel groups PG, color pixels 610A may be arranged in different diagonal directions or may be disposed in the first direction or the second direction, in at least a portion of the pixel groups PG.

A pixel array of an image sensor according to an embodiment of the present disclosure may include color pixels and white pixels. The color pixels and the white pixels may provide a plurality of pixel groups, each of the pixel groups may include at least one color pixel, among the color pixels, and peripheral white pixels disposed around the at least one color pixel, among the white pixels. A ratio of the number of color pixels to the number of white pixels, included in the pixel array, may be equal to a ratio of the number of at least one color pixel to the number of white pixels, included in each of the pixel groups. For example, each of the pixel groups may include at least one color pixel and white pixels at the same ratio.

The number of color pixels and the number of white pixels included in the pixel array may be determined in consideration of a ratio of cone cells and rod cells, present in a human eye. For example, the number of white pixels may be four or more times the number of color pixels. According to embodiments, the number of white pixels may not be expressed as an integer multiple of the number of color pixels.

Figure 18:
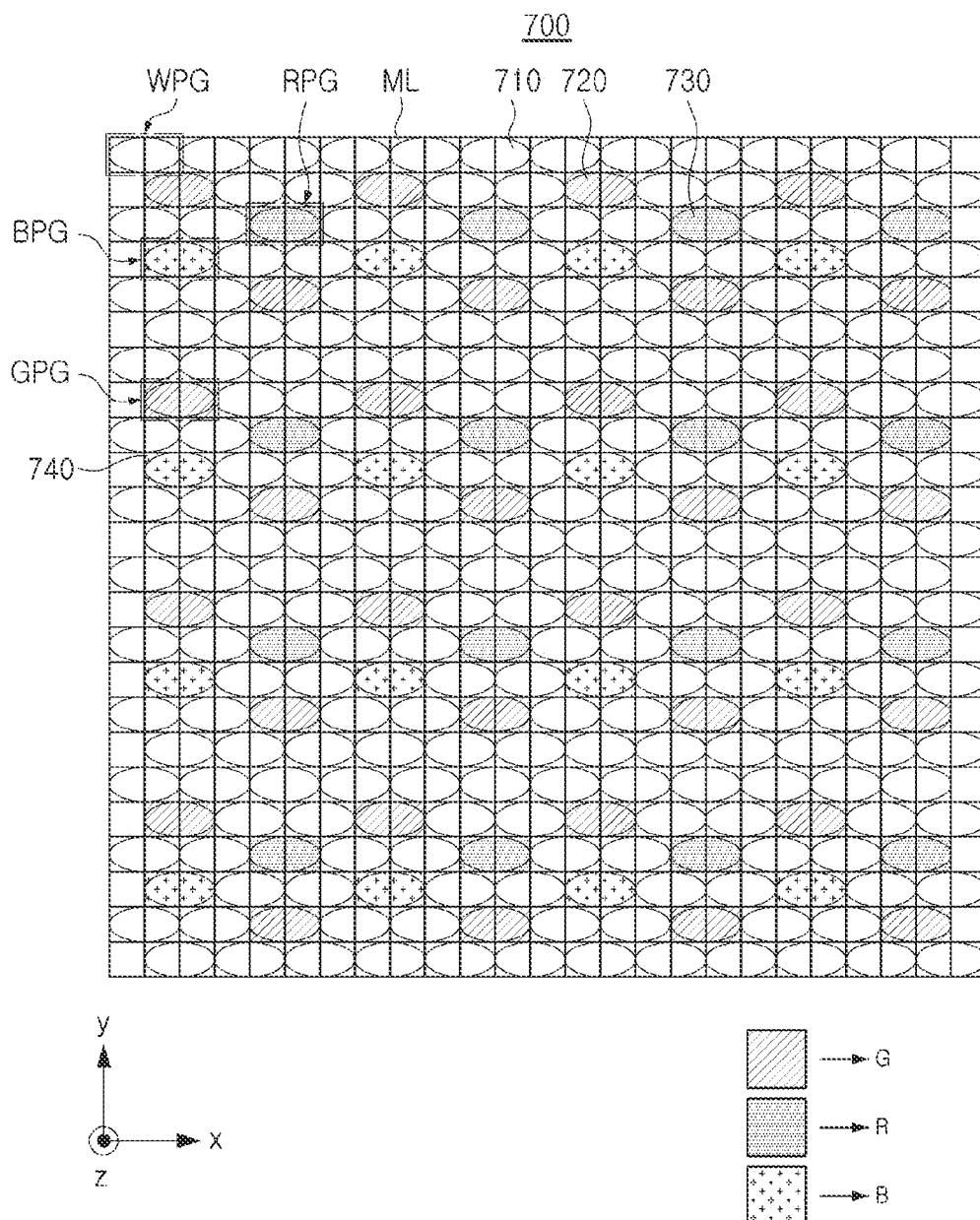
FIGS. 18 and 19 are views schematically illustrating a pixel array of an image sensor according to an embodiment of the present disclosure.
Figure 19:
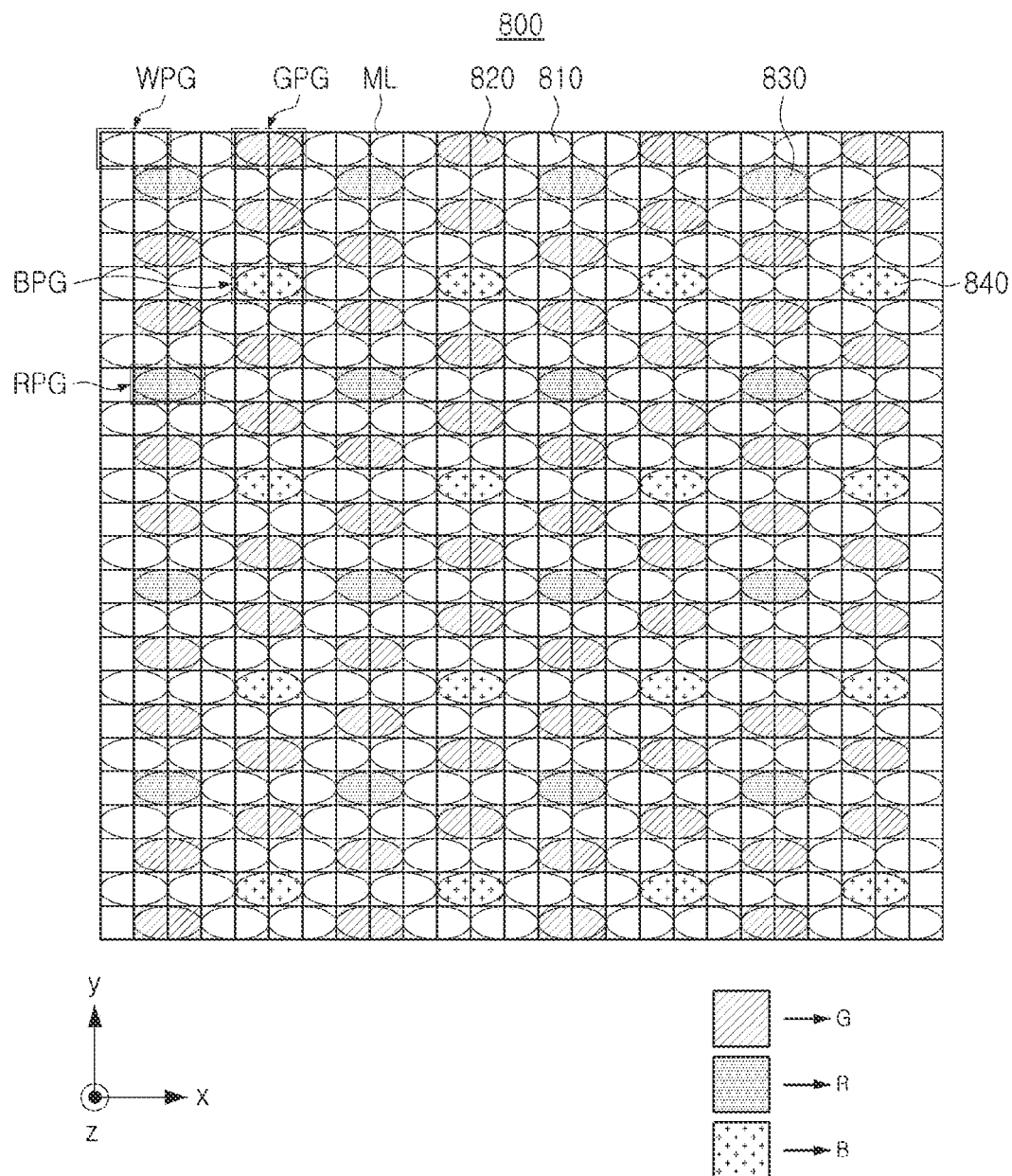

FIGS. 18 and 19 are views schematically illustrating a pixel array of an image sensor according to an embodiment of the present disclosure.

In embodiments illustrated in FIGS. 18 and 19, pixel arrays 700 and 800 may include a plurality of pixel groups WPG, RPG, GPG, and BPG, respectively. For example, the plurality of pixel groups WPG, RPG, GPG, and BPG may be classified as white pixel groups WPG, red color pixel groups RPG, green color pixel groups GPG, and blue color pixel groups BPG, and each of the plurality of pixel groups WPG, RPG, GPG, and BPG may include a pair of pixels adjacent in the first direction (the X-axis direction). According to embodiments, each of the plurality of pixel groups WPG, RPG, GPG, and BPG may include a pair of pixels adjacent in the second direction (the Y-axis direction).

In the pixel array 700 according to the embodiment illustrated in FIG. 18, the plurality of pixel groups WPG, RPG, GPG, and BPG may be arranged in the first direction and the second direction, and the number of white pixel groups WPG may be greater than the number of color pixel groups RPG, GPG, and BPG. Each of the white pixel groups WPG may include a pair of white pixels 710, and the color pixel groups RPG, GPG, and BPG may include a pair of color pixels 720, 730, and 740, respectively. The pair of pixels included in each of the plurality of pixel groups WPG, RPG, GPG, and BPG may share a microlens ML, and thus a logic circuit connected to the pixel array 700 may implement an autofocusing function using a phase difference between pixel signals acquired from the pair of pixels included in each of the plurality of pixel groups WPG, RPG, GPG, and BPG. Due to arrangement of the pixel groups WPG, RPG, GPG, and BPG in the pixel array 700, microlenses ML may be arranged in a zigzag form in the second direction.

In an embodiment, first pixel groups disposed in a first position in the second direction, among the plurality of pixel groups WPG, RPG, GPG, and BPG, may include a portion of the color pixel groups RPG, GPG, and BPG and a portion of the white pixel groups WPG. Referring to FIG. 18, in a second line from the top in the second direction, green color pixel groups GPG respectively including a pair of green color pixels 720, and white pixel groups WPG may be arranged. As illustrated in FIG. 18, at least one white pixel group WPG may be disposed between a pair of green color pixel groups GPG closest to each other in the first direction.

First color pixels constituting first color pixel groups may include color filters passing light of the same color. For example, in the embodiment illustrated in FIG. 18, in the second line from the top in the second direction, only green color pixel groups GPG including green color pixels 720 including green color filters may be disposed. Similarly, in a third line from the top in the second direction, red color pixel groups RPG including red color pixels 730 may be arranged together with white pixel groups WPG and in a fourth line from the top in the second direction, blue color pixel groups BPG including blue color pixels 740 may be arranged together with white pixel groups WPG. For example, color pixel groups RPG, GPG, and BPG of different colors may not be arranged together in the first direction.

Second pixel groups disposed in a second position, different from the first position, in the second direction may include only second white pixel groups, which may be a portion of the white pixel groups. Referring to FIG. 18, only white pixel groups WPG may be disposed in the first line from the top in the second direction. For example, the second pixel groups may not include the color pixel groups RPG, GPG, and BPG.

In an embodiment, color pixel groups RPG, GPG, and BPG may be arranged at different positions in the second direction according to a color passed by a color filter. Referring to FIG. 18, green color pixel groups GPG, red color pixel groups RPG, and blue color pixel groups BPG may be arranged at different positions in the second direction. Also, the number of green color pixel groups GPG may be greater than the number of red color pixel groups RPG and the number of blue color pixel groups BPG.

At least one of the green color pixel groups GPG may be disposed at the same position as at least one of the red color pixel groups RPG or the blue color pixel groups BPG in the first direction. Also, the color pixel groups RPG, GPG, and BPG disposed at the same position in the first direction may not be continuously arranged and at least one of the white pixel groups WPG may be disposed therebetween. For example, at least one of the white pixel groups WPG may be disposed between at least one of the green color pixel groups GPG and at least one of the blue color pixel groups BPG disposed at the same position in the first direction.

Each of the color pixel groups RPG, GPG, and BPG may be surrounded by at least a portion of the white pixel groups WPG in the first direction and the second direction. For example, in FIG. 18, boundaries of each of the color pixel groups RPG, GPG, and BPG may be in contact with boundaries of the white pixel groups WPG, not boundaries of the other color pixel groups among the color pixel groups RPG, GPG, and BPG.

The pixel array 800 according to the embodiment illustrated in FIG. 19 may have a structure similar to that of the pixel array 700 described with reference to FIG. 18. The number of white pixel groups WPG included in the pixel array 800 according to the embodiment illustrated in FIG. 19 may be relatively less than the number of white pixel groups WPG included in the pixel array 700 described with reference to FIG. 18.

Referring to FIG. 19, at least one color pixel group among color pixel groups RPG, GPG, and BPG may be disposed in all positions defined in the second direction. For example, a structure in which only white pixel groups WPG are disposed in a direction extending in the first direction may not appear.

Also, in the embodiment illustrated in FIG. 19, the number of green color pixel groups GPG may be greater than that in the embodiment illustrated in FIG. 18. In the embodiment illustrated in FIG. 18, the number of green color pixel groups GPG may be twice the number of red color pixel groups RPG and the number of blue color pixel groups BPG, respectively. In the embodiment illustrated in FIG. 19, the number of green color pixel groups GPG may be four times the number of red color pixel groups RPG and the number of blue color pixel groups BPG, respectively. In each of the embodiments illustrated in FIGS. 18 and 19, a ratio of the number of the white pixel groups WPG and the color pixel groups RPG, GPG, and BPG may be as illustrated in Table 1 below.

TABLE 1

|  | Embodiments | |
| --- | --- | --- |
|  | FIG. 18 | FIG. 19 |
| Number of Red Color Pixel Groups | N | M |
| Number of Blue Color Pixel Groups | N | M |
| Number of Green Color Pixel Groups | 2N | 4M |
| Number of White Pixel Groups | 14N | 12M |

In the embodiments illustrated in FIGS. 18 and 19, the number of white pixel groups WPG may be greater than the numbers of color pixel groups RPG, GPG, and BPG. This is considering the ratio of cone and rod cells in a human eye. By arranging more white pixel groups WPG, sensitivity of an image sensor may be improved and quality of an image generated by the image sensor may be improved.

Figure 20:
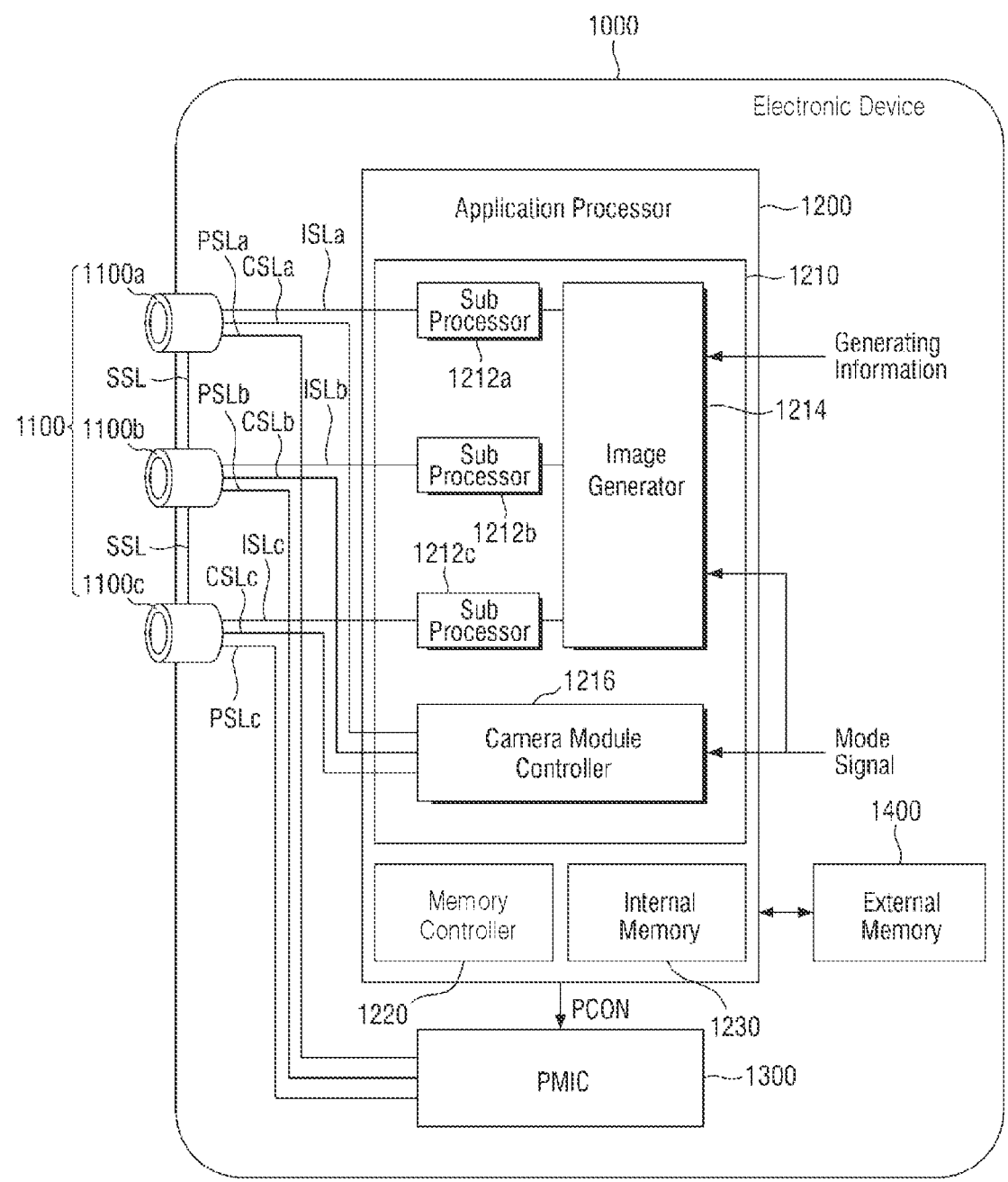
FIGS. 20 and 21 are views schematically illustrating an electronic device including an image sensor according to an embodiment of the present disclosure.
Figure 21:
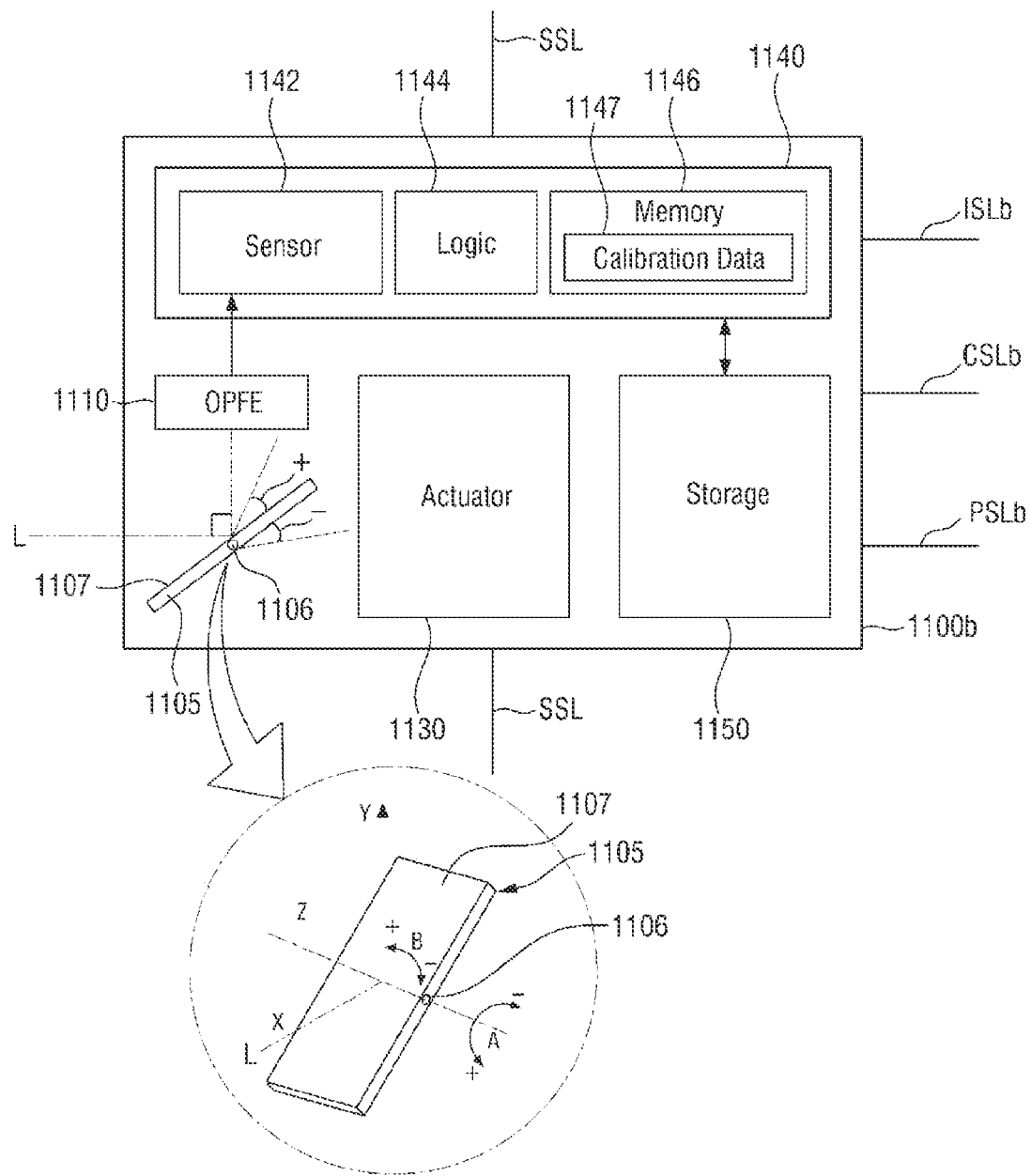

FIGS. 20 and 21 are views schematically illustrating an electronic device including an image sensor according to an embodiment of the present disclosure.

Referring to FIG. 20, an electronic device 1000 may include a camera module group 1100, an application processor 1200, a PMIC 1300, and an external memory 1400.

The camera module group 1100 may include a plurality of camera modules 1100a, 1100b, and 1100c. Although the drawing illustrates an embodiment in which three (3) camera modules 1100a, 1100b, and 1100c are arranged, embodiments are not limited thereto. In an embodiment, the camera module group 1100 may be modified to include only two (2) camera modules. In addition, in an embodiment, the camera module group 1100 may be modified and implemented to include n (where n is a natural number of 4 or more) camera modules. In addition, in an embodiment, at least one of the plurality of camera modules 1100a, 1100b, and 1100c included in the camera module group 1100 may include the image sensors described in FIGS. 1 to 19.

Hereinafter, referring to FIG. 21, a configuration of the camera module 1100b will be described in more detail, but the following description may be equally applied to other camera modules 1100a and 1100c according to an embodiment.

Referring back to FIG. 21, the camera module 1100b may include a prism 1105, an optical path folding element (hereinafter referred to as "OPFE") 1110, an actuator 1130, an image sensing device 1140, and a storage device 1150.

The prism 1105 may include a reflective surface 1107 of a light reflecting material to change a path of light L externally incident.

In an embodiment, the prism 1105 may change the path of the light L, incident in the first direction X, to the second direction Y, perpendicular to the first direction X. In addition, the prism 1105 may rotate the reflective surface 1107 of the light reflecting material in a direction A around a central axis 1106 or may rotate the central axis 1106 in a direction B, to change the path of the light L incident in the first direction X to the second direction Y, perpendicular thereto. In this case, the OPFE 1110 may also move in the third direction Z, perpendicular to the first direction X and the second direction Y.

In an embodiment, as illustrated, a maximum rotation angle of the prism 1105 may be 15 degrees or less in a positive (+) direction of the direction A and may be greater than 15 degrees in a negative (−) direction of the direction A. Embodiments are not limited thereto.

In an embodiment, the prism 1105 may move in a positive (+) direction or a negative (−) direction of the direction B by around 20 degrees or between 10 degrees and 20 degrees or between 15 degrees and 20 degrees. In this case, a moving angle may be an angle that may move at the same angle or may move to almost the same angle in a range of around 1 degree in the positive (+) or negative (−) direction of the direction B.

In an embodiment, the prism 1105 may move the reflective surface 1107 of the light reflecting material in the third direction (e.g., the direction Z), parallel to an extending direction of the central axis 1106.

The OPFE 1110 may include, for example, optical lenses of m (where m is a natural number) groups. The m optical lenses may move in the second direction Y to change an optical zoom ratio of the camera module 1100b. For example, if a basic optical zoom magnification of the camera module 1100b is Z, when the m optical lenses included in the OPFE 1110 move, an optical zoom magnification of the camera module 1100b may be changed to have an optical zoom magnification of 3Z, 5Z, or higher.

The actuator 1130 may move the OPFE 1110 or an optical lens (hereinafter, referred to as an optical lens) to a specific position. For example, the actuator 1130 may adjust a position of the optical lens to locate an image sensor 1142 at a focal length of the optical lens for accurate sensation.

The image sensing device 1140 may include an image sensor 1142, a control logic 1144, and a memory 1146. The image sensor 1142 may sense an image of an object to be sensed by using light L provided through an optical lens. The control logic 1144 may control an overall operation of the camera module 1100b. For example, the control logic 1144 may control an operation of the camera module 1100b according to a control signal provided through a control signal line CSLb.

The memory 1146 may store information necessary for an operation of the camera module 1100b, such as calibration data 1147. The calibration data 1147 may include information necessary for the camera module 1100b to generate image data using light L externally provided. The calibration data 1147 may include, for example, information on the degree of rotation, described above, information on a focal length, information on an optical axis, or the like. When the camera module 1100b is implemented in the form of a multi-state camera of which a focal length is changed according to a position of the optical lens, the calibration data 1147 may include a focal length value for each position (or state) of the optical lens and information related to autofocusing.

The storage device 1150 may store the image data sensed by the image sensor 1142. The storage device 1150 may be disposed outside the image sensing device 1140 and may be implemented in stacked form with a sensor chip constituting the image sensing device 1140. In an embodiment, the storage device 1150 may be implemented as an electrically erasable programmable read-only memory (EEPROM), but embodiments are not limited thereto.

Referring to FIGS. 20 and 21 together, in an embodiment, the plurality of camera modules 1100a, 1100b, and 1100c may include the actuator 1130, respectively. Therefore, the plurality of camera modules 1100a, 1100b, and 1100c may include the same or different calibration data 1147, respectively, according to an operation of the actuator 1130 included therein.

In an embodiment, a camera module (e.g., 1100b), among the plurality of camera modules 1100a, 1100b, and 1100c, may be a folded lens type camera module including the prism 1105 and the OPFE 1110, described above, and remaining camera module(s) (e.g., 1100a or 1100c) may be a vertical type camera module not including the prism 1105 and the OPFE 1110, but embodiments are not limited thereto.

In an embodiment, a camera module (e.g., 1100c), among the plurality of camera modules 1100a, 1100b, and 1100c, may be a vertical type depth camera for extracting depth information using, for example, infrared ray (IR). In this case, the application processor 1200 may merge image data provided from the depth camera with image data provided from another camera module (for example, 1100a or 1100b) to generate a 3D depth image.

In an embodiment, at least two camera modules (e.g., 1100a and 1100b), among the plurality of camera modules 1100a, 1100b, and 1100c, may have different fields of view (e.g., field of view angles). In this case, for example, optical lenses of the at least two camera modules (e.g., 1100a and 1100b), among the plurality of camera modules 1100a, 1100b, and 1100c, may be different from each other, but are not limited thereto.

In addition, in an embodiment, field of view angles of each of the plurality of camera modules 1100a, 1100b, and 1100c may be different. In this case, optical lenses included in each of the plurality of camera modules 1100a, 1100b, and 1100c may also be different from each other, but are not limited thereto.

In an embodiment, each of the plurality of camera modules 1100a, 1100b, and 1100c may be arranged to be physically separated from each other. For example, a sensation area of one (1) image sensor 1142 may not be divided and used by the plurality of camera modules 1100a, 1100b, and 1100c, but an independent image sensor 1142 inside each of the plurality of camera modules 1100a, 1100b, and 1100c may be disposed.

Referring back to FIG. 20, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented to be separated from each other, as separate semiconductor chips.

The image processing device 1210 may include a plurality of sub-image signal processors 1212a, 1212b, and 1212c, an image generator 1214, and a camera module controller 1216.

The image processing device 1210 may include a plurality of sub-image signal processors 1212a, 1212b, and 1212c, corresponding to the number of camera modules 1100a, 1100b, and 1100c.

Image data generated from each of the camera modules 1100a, 1100b, and 1100c may be provided to the corresponding sub-image signal processors 1212a, 1212b, and 1212c through image signal lines ISLa, ISLb, and ISLc, separated from each other. For example, image data generated from the camera module 1100a may be provided to the sub-image signal processor 1212a through the image signal line ISLa, image data generated from the camera module 1100b may be provided to the sub-image signal processor 1212b through the image signal line ISLb, and image data generated from the camera module 1100c may be provided to the sub-image signal processor 1212c through the image signal line ISLc. Transmission of such image data may be performed using, for example, a camera serial interface (CSI) based on a mobile industry processor interface (MIPI), but embodiments are not limited thereto.

In an embodiment, a sub-image signal processor may be disposed to correspond to a plurality of camera modules. For example, the sub-image signal processor 1212a and the sub-image signal processor 1212c may not be implemented to be separated from each other, as illustrated, but may be implemented to be integrated into a single sub-image signal processor, and image data provided from the camera module 1100a and the camera module 1100c may be selected by a select element (e.g., a multiplexer) or the like, and may be then provided to the integrated sub-image signal processor.

Image data provided to each of the sub-image signal processors 1212a, 1212b, and 1212c may be provided to the image generator 1214. The image generator 1214 may use the image data provided from each of the sub-image signal processors 1212a, 1212b, and 1212c, according to image generation information or a mode signal, to generate an output image.

Specifically, the image generator 1214 may merge at least portion of the image data generated from the camera modules 1100a, 1100b, and 1100c having different field of view angles, according to image generation information or a mode signal, to generate an output image. In addition, the image generator 1214 may generate an output image by selecting any one of image data generated from camera modules 1100a, 1100b, and 1100c having different field of view angles according to image generation information or a mode signal.

In an embodiment, the image generation information may include a zoom signal or a zoom factor. Further, in an embodiment, the mode signal may be, for example, a signal based on a mode selected by a user.

When the image generation information is a zoom signal (e.g., a zoom factor) and each of the camera modules 1100a, 1100b, and 1100c has different fields of view (e.g., field of view angles), the image generator 1214 may operate differently according to a type of the zoom signal. For example, when the zoom signal is a first signal, after merging image data output from the camera module 1100a and image data output from the camera module 1100c, the merged image signal and image data output from the camera module 1100b, not used in the merging, may be used to generate an output image. When the zoom signal is a second signal, different from the first signal, the image generator 1214 may not perform such image data merging and may select any one of the image data output from each of the camera module 1100a, 1100b, and 1100c, to create an output image. Embodiments are not limited thereto, and a method of processing image data may be modified and performed as needed.

In an embodiment, the image generator 1214 may receive a plurality of pieces of image data having different exposure points in time from at least one sub-image signal processor, among the plurality of sub-image signal processors 1212a, 1212b, and 1212c, and may process high dynamic range (HDR) with respect to the plurality of pieces of image data, to generate merged image data having an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through control signal lines CSLa, CSLb, and CSLc, separated from each other.

Any one of the plurality of camera modules 1100a, 1100b, and 1100c may be designated as a master camera (for example, 1100b), according to image generation information including a zoom signal or a mode signal, and remaining camera modules (for example, 1100a and 1100c) may be designated as slave cameras. Such information may be included in the control signal and may be provided to the corresponding camera modules 1100a, 1100b, and 1100c through the control signal lines CSLa, CSLb, and CSLc, separated from each other.

Camera modules operating as masters and slaves may be changed according to a zoom factor or an operation mode signal. For example, when a field of view angle of the camera module 1100a is wider than a field of view angle of the camera module 1100b and the zoom factor indicates a low zoom magnification, the camera module 1100b may operate as a master and the camera module 1100a may operate as a slave. When the zoom factor indicates a high zoom magnification, the camera module 1100a may operate as a master and the camera module 1100b may operate as a slave.

In an embodiment, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving such a sync enable signal may generate a sync signal based on the sync enable signal and may transmit the generated sync signal to the camera modules 1100a and 1100c through a sync signal line SSL. The camera module 1100b and the camera modules 1100a and 1100c may be synchronized with the sync signal, to transmit image data to the application processor 1200.

In an embodiment, a control signal provided from the camera module controller 1216 to the plurality of camera modules 1100a, 1100b, and 1100c may include mode information according to a mode signal. Based on this mode information, the plurality of camera modules 1100a, 1100b, and 1100c may operate in a first operation mode and a second operation mode in relation to a sensation rate.

In the first operation mode, the plurality of camera modules 1100a, 1100b, and 1100c may generate an image signal at a first rate (for example, generate an image signal having a first frame rate), may encode the generated image signal at a second rate, higher than the first rate (e.g., encode an image signal having a second frame rate, higher than the first frame rate), and may transmit the encoded image signal to the application processor 1200. In this case, the second rate may be 30 times or less of the first rate.

The application processor 1200 may store the transmitted image signal, e.g., the encoded image signal, in the internal memory 1230, or in a storage 1400 outside the application processor 1200 and may then read the encoded image signal from the internal memory 1230 or the storage 1400, may decode the read image signal, and may display image data generated based on the decoded image signal. For example, a corresponding sub-image signal processor, among the plurality of sub-image signal processors 1212a, 1212b, and 1212c of the image processing device 1210, may decode the read image signal and may also perform image processing on the decoded image signal.

In the second operation mode, the plurality of camera modules 1100a, 1100b, and 1100c may generate an image signal at a third rate, lower than the first rate (e.g., generate an image signal having a third frame rate, lower than the first frame rate), and may transmit the image signal to the application processor 1200. The image signal provided to the application processor 1200 may be a signal, not encoded. The application processor 1200 may perform image processing on the received image signal or may store the received image signal in the internal memory 1230 or the storage 1400.

The PMIC 1300 may supply power, for example, a power voltage to each of the plurality of camera modules 1100a, 1100b, and 1100c. For example, under control of the application processor 1200, the PMIC 1300 may supply first power to the camera module 1100a through a power signal line PSLa, may supply second power to the camera module 1100b through a power signal line PSLb, and may supply third power to the camera module 1100c through a power signal line PSLc.

The PMIC 1300 may generate power, corresponding to each of the plurality of camera modules 1100a, 1100b, and 1100c, in response to a power control signal PCON from the application processor 1200 and may also adjust a level of the power. The power control signal PCON may include a power adjustment signal for each operation mode of the plurality of camera modules 1100a, 1100b, and 1100c. For example, the operation mode may include a low power mode. In this case, the power control signal PCON may include information on a camera module operating in the low power mode and a level of the power to be set. The levels of pieces of power provided to each of the plurality of camera modules 1100a, 1100b, and 1100c may be the same or different from each other. Also, the level of power may be dynamically changed.

According to an embodiment of the present disclosure, a pixel array may be composed of color pixels and white pixels by simulating a cone cell and a rod cell, included in a human eye, and binning and remosaic may be appropriately applied to raw data output from the pixel array according to external illuminance. Therefore, an image sensor having excellent sensitivity and resolution may be implemented.

Various advantages and effects of the present disclosure are not limited to the above-described contents and can be more easily understood in the course of describing specific embodiments of the present disclosure.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While embodiments have been illustrated and described above, it will be apparent to those skilled in the art that modifications and variations could be made without departing from the scope of the present disclosure as defined by the appended claims.

What is claimed is:

1. An image sensor comprising:
a pixel array including a plurality of pixels arranged in a first direction and a second direction, intersecting with the first direction, each of the plurality of pixels including at least one photodiode, a pixel circuit below the photodiode, and a color filter above the photodiode; and
a logic circuit configured to acquire a pixel signal from each of the plurality of pixels through a plurality of column lines extending in the second direction, wherein:
the plurality of pixels includes color pixels and white pixels, the number of the white pixels being greater than the number of the color pixels,
the pixel circuit includes a floating diffusion in which charges of the photodiode are accumulated and transistors outputting a voltage corresponding to amounts of the charges in the floating diffusion, and
each of the color pixels shares the floating diffusion with at least one neighboring white pixel, among the white pixels, and each of the color pixels is adjacent to the at least one neighboring white pixel, in the second direction.

2. The image sensor of claim 1, wherein the color filter in each of the color pixels passes one of red light, green light, and blue light and the color filter in each of the white pixels passes white light.

3. The image sensor of claim 1, wherein two or more white pixels among the white pixels are disposed between a pair of color pixels adjacent to each other in the first direction or the second direction, among the color pixels.

4. The image sensor of claim 1, wherein the number of the white pixels is four or more times the number of the color pixels.

5. The image sensor of claim 4, wherein each of the color pixels is included in one pixel group with at least eight peripheral white pixels.

6. The image sensor of claim 1, wherein each of the color pixels comprises a first photodiode and a second photodiode arranged in the first direction or the second direction.

7. The image sensor of claim 1, wherein the each of the color pixels and the white pixels comprises a first photodiode and a second photodiode arranged in the first direction or the second direction.

8. An image sensor comprising:
a pixel array including a plurality of pixels connected to a plurality of row lines extending in a first direction and a plurality of column lines extending in a second direction, intersecting with the first direction, each of the plurality of pixels including at least one photodiode and a pixel circuit below the at least one photodiode; and
a logic circuit configured to acquire a pixel signal from each of the plurality of pixels, wherein:
the plurality of pixels includes color pixels and white pixels, the number of the white pixels being greater than the number of the color pixels, and
the logic circuit is configured to acquire the pixel signal only from each of the color pixels when external illuminance is equal to or higher than a threshold value and acquire the pixel signal from each of the plurality of pixels when external illuminance is lower than the threshold value.

9. The image sensor of claim 8, wherein the logic circuit performs a remosaic process for the pixel signal acquired from each of the color pixels to generate an image, when the external illuminance is equal to or greater than the threshold value.

10. The image sensor of claim 8, wherein:
the plurality of pixels comprises a plurality of pixel groups, and
each of the plurality of pixel groups includes at least one color pixel among the color pixels and two or more peripheral white pixels among the white pixels.

11. The image sensor of claim 10, wherein the logic circuit is configured to simultaneously acquire the pixel signal from each of two or more pixels sharing one column line among the plurality of column lines, in each of the plurality of pixel groups, when the external illuminance is lower than the threshold value.

12. The image sensor of claim 11, wherein the image sensor is configured to use the pixel signal acquired from each of the plurality of pixel groups to generate image data.

13. The image sensor of claim 8, wherein the number of the white pixels is four or more times the number of the color pixels.

14. An image sensor comprising:
a pixel array including a plurality of pixels connected to a plurality of row lines extending in a first direction and a plurality of column lines extending in a second direction, intersecting with the first direction, the plurality of pixels providing a plurality of pixel groups; and
a logic circuit configured to acquire a pixel signal from each of the plurality of pixels, wherein:
the plurality of pixels includes color pixels and white pixels, the number of the white pixels being greater than the number of the color pixels,
each of the plurality of pixel groups includes at least one color pixel among the color pixels and peripheral white pixels disposed around the at least one color pixel among the white pixels, and
a boundary between a pair of adjacent pixel groups among the plurality of pixel groups is a boundary between the peripheral white pixels.

15. The image sensor of claim 14, wherein:

each of the plurality of pixel groups comprises two or more color pixels among the color pixels, and the two or more color pixels have a color filter of the same color.

16. The image sensor of claim 15, wherein the two or more color pixels are continuously arranged in at least one of the first direction or the second direction.

17. The image sensor of claim 15, wherein the two or more color pixels are adjacent to each other in a diagonal direction, different from the first direction and the second direction.

18. The image sensor of claim 14, wherein:

the plurality of pixel groups comprises a first pixel group and a second pixel group adjacent to the first pixel group in the first direction or the second direction, and the at least one color pixel included in the first pixel group and the at least one color pixel included in the second pixel group comprise color filters having different colors.

19. The image sensor of claim 18, wherein two or more white pixels among the white pixels are disposed between the at least one color pixel included in the first pixel group and the at least one color pixel included in the second pixel group.

20. The image sensor of claim 14, wherein:

each of the plurality of pixels comprises a photodiode generating charges in response to light and a pixel circuit using the charges of the photodiode to output the pixel signal, and the at least one color pixel and at least one neighboring white pixel sharing one of the column lines with the at least one color pixel share at least a portion of elements included in the pixel circuit.

\* \* \* \* \*